United States Patent
Takano

(10) Patent No.: US 9,710,207 B2
(45) Date of Patent: Jul. 18, 2017

(54) INFORMATION PROCESSING SYSTEM IN WHICH A PRINTER ASSOCIATED WITH A WEB BROWSER CAN BE DELETED

(71) Applicant: CANON KABUSHIKI KAISHA, Tokyo (JP)

(72) Inventor: Shinichi Takano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 58 days.

(21) Appl. No.: 14/002,350

(22) PCT Filed: Apr. 30, 2013

(86) PCT No.: PCT/JP2013/062986
§ 371 (c)(1),
(2) Date: Aug. 29, 2013

(87) PCT Pub. No.: WO2013/179864
PCT Pub. Date: Dec. 5, 2013

(65) Prior Publication Data
US 2014/0078541 A1    Mar. 20, 2014

(30) Foreign Application Priority Data

May 31, 2012    (JP) .................. 2012-125152

(51) Int. Cl.
*G06K 15/00* (2006.01)
*G06F 3/12* (2006.01)

(52) U.S. Cl.
CPC .......... *G06F 3/1237* (2013.01); *G06F 3/1203* (2013.01); *G06F 3/1229* (2013.01); *G06F 3/1274* (2013.01); *G06F 3/1288* (2013.01); *G06F 3/1204* (2013.01); *G06F 3/1207* (2013.01); *G06F 3/1267* (2013.01)

(58) Field of Classification Search
CPC ...... G06F 3/1204; G06F 3/1285; G06F 3/121; G06F 3/1292; G06F 3/1261; G06F 3/1268
See application file for complete search history.

(56) References Cited

U.S. PATENT DOCUMENTS

| | | | |
|---|---|---|---|
| 5,893,083 A * | 4/1999 | Eshghi et al. | 706/45 |
| 8,363,245 B2 | 1/2013 | Ono | |
| 8,531,711 B2 | 9/2013 | Kitagata | |
| 8,576,422 B2 | 11/2013 | Kimura | |
| 8,804,163 B2 | 8/2014 | Kimura | |
| 2003/0053106 A1 * | 3/2003 | Kuroda | G06F 3/1203 358/1.13 |
| 2007/0268518 A1 * | 11/2007 | Yokoyama | 358/1.15 |
| 2007/0273923 A1 * | 11/2007 | Kimura | 358/1.15 |

(Continued)

FOREIGN PATENT DOCUMENTS

| | | |
|---|---|---|
| JP | 2007-317088 A | 12/2007 |
| JP | 2007-328609 A | 12/2007 |

(Continued)

*Primary Examiner* — Henok A Shiferaw
(74) *Attorney, Agent, or Firm* — Fitzpatrick, Cella, Harper & Scinto

(57) ABSTRACT

If printing from an external print service is disabled in a print relay service, the external print service is instructed to disable the status of a printer associated with the print relay service, and disables the status of the instructed printer. Hence, the user of the external print service can easily recognize the unavailable disabled printer.

10 Claims, 34 Drawing Sheets

(56) References Cited

U.S. PATENT DOCUMENTS

| | | | |
|---|---|---|---|
| 2010/0171973 A1* | 7/2010 | Kimura | G06F 3/1204 358/1.14 |
| 2011/0075204 A1 | 3/2011 | Yoshimura | |
| 2012/0050799 A1* | 3/2012 | Towata | G06F 3/122 358/1.15 |

FOREIGN PATENT DOCUMENTS

| | | |
|---|---|---|
| JP | 2010-160579 A | 7/2010 |
| JP | 2011-76308 A | 4/2011 |
| JP | 2012-63944 A | 3/2012 |
| KR | 10-2010-0081946 A | 7/2010 |

\* cited by examiner

FIG. 12

To : <UserB@xxx.com>
Subject : NOTIFICATION FROM EXTERNAL PRINT SERVICE
Message :
User B
MANAGER User A HAS CHANGED STATUS OF
Printer1 SHARED BY YOU TO OFFLINE

| 1410 | 1402 | 1403 | 1404 | 1405 | 1406 | 1407 | 1408 | 1409 |
|---|---|---|---|---|---|---|---|---|
| SPID | PRINTER MANAGER | PRINTER NAME | PROXY ID | RPID | CAPABILITIES | PRINT SETTING INITIAL VALUE | STATUS | SHARE USER |
| 5842 | UserA | Printer1 | Proxy-A | RP-001 | PrnCaps-1 | PrnTicket-1 | online | - |
| 1506 | UserA | Printer2 | Proxy-A | RP-002 | PrnCaps-2 | PrnTicket-2 | online | - |
| 5126 | UserA | Printer3 | Proxy-A | RP-003 | PrnCaps-3 | PrnTicket-3 | online | UserB |
| 1912 | UserA | Printer4 | Proxy-A | RP-004 | PrnCaps-4 | PrnTicket-4 | online | UserB |
| 4866 | UserA | Printer5 | Proxy-B | RP-005 | PrnCaps-5 | PrnTicket-5 | online | UserB |
| 4814 | UserA | Printer6 | Proxy-B | RP-006 | PrnCaps-6 | PrnTicket-6 | online | UserB |
| 7423 | UserC | Printer7 | Proxy-C | RP-007 | PrnCaps-7 | PrnTicket-7 | online | UserB |

FIG. 14B

| 1410 | 1402 | 1403 | 1404 | 1405 | 1406 | 1407 | 1408 | 1409 |
|---|---|---|---|---|---|---|---|---|
| SPID | PRINTER MANAGER | PRINTER NAME | PROXY ID | RPID | CAPABILITIES | PRINT SETTING INITIAL VALUE | STATUS | SHARE USER |
| 5842 | UserA | Printer1 | Proxy-A | RP-001 | PrnCaps-1 | PrnTicket-1 | offline | - |
| 1506 | UserA | Printer2 | Proxy-A | RP-002 | PrnCaps-2 | PrnTicket-2 | online | - |
| 5126 | UserA | Printer3 | Proxy-A | RP-003 | PrnCaps-3 | PrnTicket-3 | online | UserB |
| 1912 | UserA | Printer4 | Proxy-A | RP-004 | PrnCaps-4 | PrnTicket-4 | online | UserB |
| 4866 | UserA | Printer5 | Proxy-B | RP-005 | PrnCaps-5 | PrnTicket-5 | online | UserB |
| 4814 | UserA | Printer6 | Proxy-B | RP-006 | PrnCaps-6 | PrnTicket-6 | online | UserB |
| 7423 | UserC | Printer7 | Proxy-C | RP-007 | PrnCaps-7 | PrnTicket-7 | online | UserB |

14b

F I G. 14C

| 1410 | 1402 | 1403 | 1404 | 1405 | 1406 | 1407 | 1408 | 1409 |
|---|---|---|---|---|---|---|---|---|
| SPID | PRINTER MANAGER | PRINTER NAME | PROXY ID | RPID | CAPABILITIES | PRINT SETTING INITIAL VALUE | STATUS | SHARE USER |
| 5842 | UserA | Printer1 | Proxy-A | RP-001 | PrnCaps-1 | PrnTicket-1 | offline | - |
| 1506 | UserA | Printer2 | Proxy-A | RP-002 | PrnCaps-2 | PrnTicket-2 | offline | - |
| 5126 | UserA | Printer3 | Proxy-A | RP-003 | PrnCaps-3 | PrnTicket-3 | offline | UserB |
| 1912 | UserA | Printer4 | Proxy-A | RP-004 | PrnCaps-4 | PrnTicket-4 | offline | UserB |
| 4866 | UserA | Printer5 | Proxy-B | RP-005 | PrnCaps-5 | PrnTicket-5 | online | UserB |
| 4814 | UserA | Printer6 | Proxy-B | RP-006 | PrnCaps-6 | PrnTicket-6 | online | UserB |
| 7423 | UserC | Printer7 | Proxy-C | RP-007 | PrnCaps-7 | PrnTicket-7 | online | UserB |

```
<Capabilities>
    <Duplex>
        <Item>1-Side</Item>
        <Item>2-Side</Item>
    </Duplex>
    <Color>
        <Item>mono</Item>
        <Item>color</Item>
    </Color>
    <PaperSize>
        <Item>B5</Item>
        <Item>A4</Item>
        <Item>A3</Item>
    </PaperSize>
</Capabilities>
```

FIG. 15B

```
<PrintSettings>
    <Duplex>
        <Item>1-Side</Item>
    </Duplex>
    <Color>
        <Item>color</Item>
    </Color>
    <PaperSize>
        <Item>A4</Item>
    </PaperSize>
</PrintSettings>
```

F I G. 15C

```
<Update>
    <id>
        <Item>5842</Item>
    </id>
    <name>
        <Item>Printer1</Item>
    </name>
    <proxy>
        <Item>Proxy-A</Item>
    </proxy>
    <status>
        <Item>offline</Item>
    </status>
...
</Update>
```

```
<Register>
    <name>
        <Item>Printer1</Item>
    </name>
    <proxy>
        <Item>Proxy-A</Item>
    </proxy>
    <Capabilities>
        <Duplex>
            <Item>1-Side</Item>
            <Item>2-Side</Item>
        </Duplex>
        <Color>
            <Item>mono</Item>
            <Item>color</Item>
        </Color>
        <PaperSize>
            <Item>B5</Item>
            <Item>A4</Item>
            <Item>A3</Item>
        </PaperSize>
    </Capabilities>
    <PrintSettings>
        <Duplex>
            <Item>1-Side</Item>
        </Duplex>
        <Color>
            <Item>color</Item>
        </Color>
        <PaperSize>
            <Item>A4</Item>
        </PaperSize>
    </PrintSettings>
    <status>
        <Item>online</Item>
    </status>
    ...
</Register>
```

FIG. 15E

```
<List>
    <proxy>
        <Item>Proxy-A</Item>
    </proxy>
</List>
```
15e

FIG. 15F

```
<Printers>
    <id>
        <Item>5842</Item>
    </id>
    <name>
        <Item>Printer1</Item>
    </name>
    <proxy>
        <Item>Proxy-A</Item>
    </proxy>
    <Capabilities>
        <Duplex>
            <Item>1-Side</Item>
            <Item>2-Side</Item>
        </Duplex>
        <Color>
            <Item>mono</Item>
            <Item>color</Item>
        </Color>
        <PaperSize>
            <Item>B5</Item>
            <Item>A4</Item>
            <Item>A3</Item>
        </PaperSize>
    </Capabilities>
    ...
</Printers>
```
15f

F I G. 15G

```
                                                15g
<Delete>
    <id>
        <Item>5842</Item>
    </id>
    <name>
        <Item>MFP-01</Item>
    </name>
    <proxy>
        <Item>Proxy-A</Item>
    </proxy>
</Delete>
```

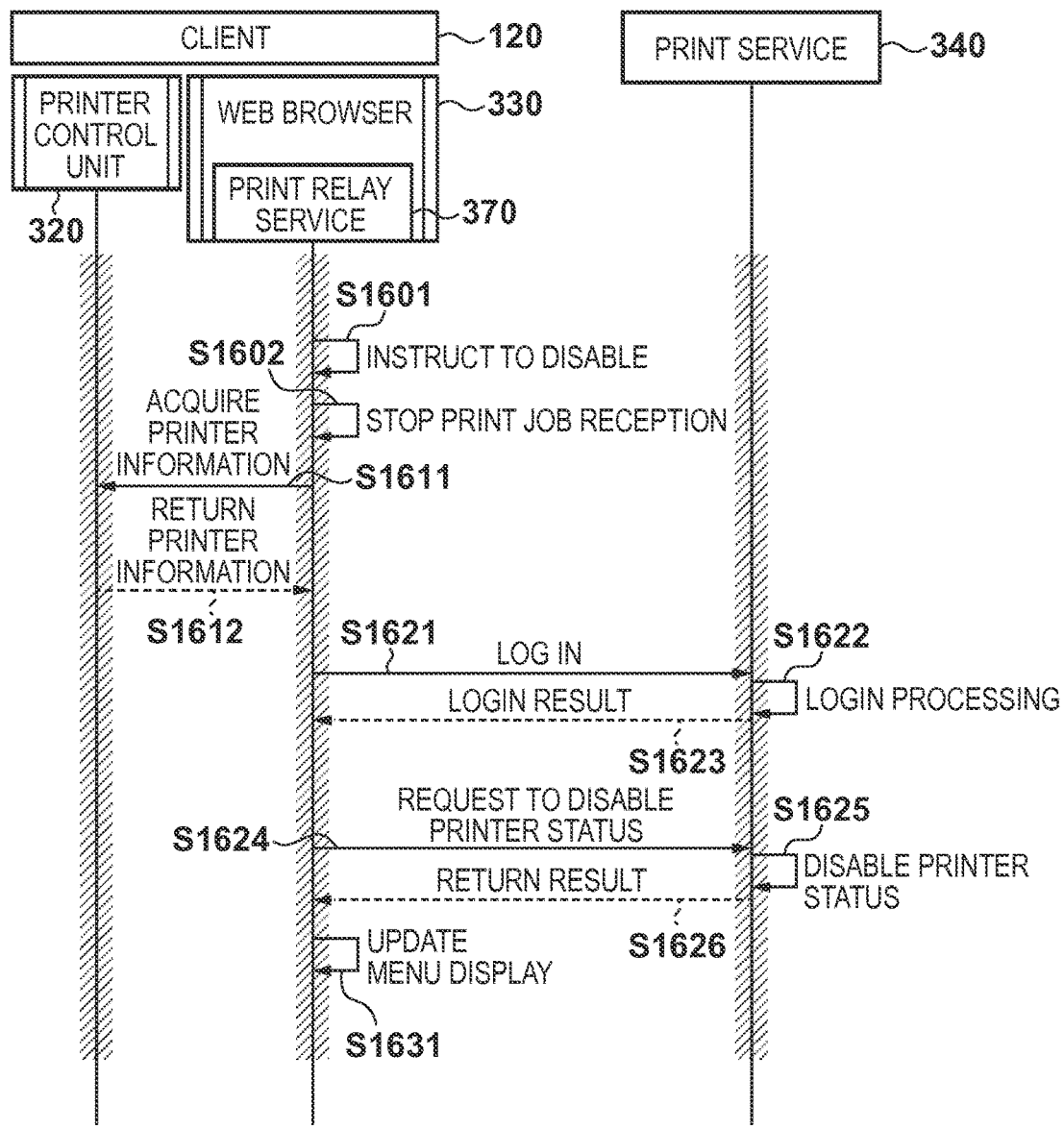

INFORMATION PROCESSING SYSTEM IN WHICH A PRINTER ASSOCIATED WITH A WEB BROWSER CAN BE DELETED

TECHNICAL FIELD

The present invention relates to an information processing system, a print server, an information processing apparatus, a control method of an information processing system, a content printing system, and a program.

BACKGROUND ART

There is conventionally a print service that causes a client to transmit a print instruction to a server and then causes the server that has received the print instruction to convert print target content into print data. The concept of cloud computing that has recently received a great deal of attention can also be regarded as a form of server's service providing to a client, like the above-described system. The cloud computing mainly features distributively executing data conversion and data processing using many computing resources and simultaneously processing requests from a number of clients. Vendors are now coming along, which implement a Web service on a cloud computing environment for implementing the cloud computing and provide a variety of print services (called cloud print services, and in this example, also simply called print services).

For example, Google Inc. has developed a mechanism of data communication to provide a print service in cooperation with a printer and released an interface that allows the printer to execute data communication with a cloud computing environment prepared by Google Inc. When this interface is implemented in the printer, a client can designate the printer and cause it to print even if the printer and the server are connected via the Internet.

The procedure until the use of a known print service will be explained below. The print service is a function implemented in a server or a server group, and makes a print application run based on an instruction from a client and provides print data by communicating with a connected printer.

First, a service printer is registered in the print service. The service printer is an instance for printer selection and is associated with a real printer. This corresponds to a print queue in a printing system of Windows®.

To register a service printer in the print service, the account of the print service is acquired. The account, printer information, and a printer ID are linked and registered in the print service. The service printer registration methods can roughly be classified into two methods. In one method, a printer supporting the print service is directly connected to the print service and registered. In the other method, a proxy service connectable to a printer is connected to the print service, and registration is performed. In this case, even a printer that cannot directly be connected to the print service can be registered in the print service through the proxy service. The proxy service indicates a print relay function implemented in an information processing apparatus, which is connectable to the print service, and registers the service printer in the print service based on the printer information and transmits print data received from the print service to a corresponding printer. The proxy service is incorporated in a Web browser of the information processing apparatus, and registers the service printer in the print service based on the information of a print queue in the information processing apparatus. For example, in the Web browser GOGGLE CHROME® provided by Google Inc., the "advanced settings" is provided with a button for enabling a Google cloud print connector. If a printer based on a print queue of the computer is unregistered, the user can register and enable the printer by pressing the button.

The service printer identified by the account and the printer ID and a print job queue are thus generated on the print service. When the user logs in from the Web browser of the information processing apparatus to the print service using the account of the print service, the service printer and the print job queue linked with the account are displayed.

To perform printing, the user instructs the print service to print from an application supporting the print service. Then, a list of service printers linked with the account of the print service to which the user has logged in is displayed. When the user selects a service printer, the application transmits a print job to the print job queue of the selected service printer. If the printer corresponding to the selected service printer supports the print service, the print job is directly transmitted from the print service to the printer and printed. If the printer corresponding to the selected service printer has been registered through a proxy service, the print job is transmitted to the printer through the proxy service. When the proxy service is incorporated in the Web browser, the print job is transferred to the print queue in the information processing apparatus and printed.

A printer is expensive to some degree and is rarely occupied by one person for continuous printing all the time. Hence, a cost advantage can be obtained when a plurality of persons share one printer and use it while shifting the print time. The print service prepares a certain solution for such utilization. To allow a plurality of users to use one service printer from the print service, the "share" function of the print service is used. First, one user registers the service printer in the print service by the above-described method. The print service links and stores the user and the service printer. The user is called a printer manager. The printer manager determines whether to allow another user to use the service printer. The printer manager then sets the account of the user determined to be able to use the printer to share the print job queue of the service printer. The print job queue of the service printer of the printer manager and the account of the user are thus linked so that the user set to share (to be referred to as a share user for short hereinafter) can transmit a print job to the print job queue. The print service manages the user set to share as well while linking it with the service printer. The user set to share need not register the service printer.

The print service is provided with a means for deleting the service printer registered by the printer manager. To delete the service printer, the printer manager logs in from the Web browser to the print service, selects the service printer to be deleted, and deletes it. The information of the service printer in the print service is thus erased and becomes invisible from the printer manager or share users. In addition, since the erased service printer is invisible, the printer manager or share users cannot transmit any print job to the print job queue of the service printer. Deletion of the service printer in the print service is done to erase the information of the printer from the print service without plans to use anymore.

On the other hand, the Web browser of the information processing apparatus is also provided with a means for disabling printing by the printer registered by the printer manager from the print service through the proxy service incorporated in the Web browser. When the disabling means is executed on the Web browser, the proxy service stops acquiring a print job from the print service. Printing from the print service to the printer registered through the proxy service is not executed anymore. In this case, the service printer registered through the proxy service remains in the print service. The printer manager or share users can transmit a print job to the print job queue of the service printer even after disabling the service printer. However, since printing by the printer, that is, print job transmission is not performed, as described above, unprinted print jobs accumulate in the print job queue. When the printer manager enables use of the print service again on the Web browser, the proxy service incorporated in the Web browser resumes print job acquisition to the print service so that printing to the printer registered through the proxy service is possible again. Disabling printing from the print service on the Web browser is done to temporarily stop use of printing from the print service to the printer linked with the proxy service incorporated in the Web browser.

Patent literature 1: Japanese Patent Laid-Open No. 2010-160579

The above-described print service has the following problems. As the first problem, when the printer manager performs, on the Web browser, the operation of disabling printing from the print service, the users of the print service cannot easily recognize that the service printer is disabled, that is, printing to the printer linked with the proxy service incorporated in the Web browser is stopped.

As the second problem, the printer manager cannot easily delete the printers registered in the print service through the proxy service incorporated in the Web browser at once.

SUMMARY OF INVENTION

The present invention has been made in consideration of the above-described related art, and notifies a share user of a cloud print service that a service printer is disabled. The present invention also provides a means for deleting service printers at once through a proxy service incorporated in a Web browser.

The present invention has the following arrangement.

According to one aspect of the present invention, there is provided an information processing system including a print server that manages a service printer corresponding to a printer connected via a network, including a user and a status, and transmits print data to a proxy associated with the service printer in accordance with a request, and an information processing apparatus that includes the proxy and communicates with the print server, wherein the information processing apparatus comprises means for requesting the print server to change the status of the service printer associated with the proxy to a disabled status in accordance with an instruction to disable the service printer associated with the proxy, and the print server comprises: means for changing the status of the service printer to the disabled status in accordance with a request to disable the service printer; and means for, in accordance with a request from a client, transmitting a list of service printers linked with the user who operates the client to the client, including the status of the service printer.

According to another aspect, the present invention has the following arrangement.

A print server that transmits print data to a proxy associated with a service printer corresponding to a printer connected via a network in accordance with a request, comprises: means for managing the service printer, including a user and a status; means for changing the status of the service printer to a disabled status in accordance with a request to disable the service printer associated with the proxy, the request being received from an information processing apparatus including the proxy; and means for, in accordance with a request from a client, transmitting a list of service printers linked with the user who operates the client to the client, including the status of the service printer.

According to still another aspect, the present invention has the following arrangement.

An information processing apparatus including a proxy that communicates with a print server that manages a service printer corresponding to a printer connected via a network, including a user and a status, comprises: means for requesting a print service to change the status of the service printer associated with the proxy to a disabled status in accordance with an instruction to disable the service printer associated with the proxy.

According to the present invention, the share user of the cloud print service can easily recognize a disabled printer.

As another effect, the printer manager can delete printers associated with the proxy service at once through a proxy server.

Further features of the present invention will become apparent from the following description of exemplary embodiments with reference to the attached drawings.

BRIEF DESCRIPTION OF DRAWINGS

FIG. 12 is a view showing a mail screen after disabling;

FIG. 14A is a view showing information stored in a printer information storage unit 341;

FIG. 14B is a view showing information stored in the printer information storage unit 341 after disabling;

FIG. 14C is a view showing part of information stored in the printer information storage unit 341;

FIG. 15A is a view showing capabilities expressed by the XML format;

FIG. 15B is a view showing print setting initial values expressed by the XML format;

FIG. 15C is a view showing a printer status update request expressed by the XML format;

FIG. 15D is a view showing a printer registration request expressed by the XML format;

FIG. 15E is a view showing a request to acquire printers associated with a proxy ID expressed by the XML format;

FIG. 15F is a view showing a printer list expressed by the XML format;

FIG. 15G is a view showing a printer deletion request expressed by the XML format;

FIG. 16 is a sequence chart showing processing of disabling the statuses of all printers registered in a print service 340 and associated with a print relay service 370 based on information acquired from a printer control unit 320;

DESCRIPTION OF EMBODIMENTS

The problems of the present invention will be described in more detail. The first problem will be explained. An in-house printer manager in a company registers in-house printers from a proxy service to an in-house print service. The printers are set to be shared by in-house general users, thereby creating an environment that allows the general users to perform printing to the in-house printers using a print service. Assume that the printer manager disables printing from the print service through the proxy service to temporarily stop printing to the printers for the purpose of repair or the like. In this case, the general users set to share cannot know that printing to the printers has been disabled. Even when performing printing from the print service, the printers do not print, and the users cannot know why.

It is not impossible to solve this problem to some extent not by a technical solution but by a human operation means, as a matter of course. For example, when the printers are disabled, all the general users may be notified using a communication means such as mail or a phone call. However, this means is burdensome for the printer manager who is responsible for many general users, and a communication error or a communication failure occurs at a high possibility.

The second problem will be explained next. A printer manager in a given company registers printers in the given company from a proxy service to a print service. In particular, assume that the proxy service is divided into areas of the given company, and the printers in each area are registered through the proxy service of that area. The printers are set to be shared by general users in the given company, thereby creating an environment that allows the general users to perform printing to the printers in the given company using a print service. Assume that the printer manager wants to delete all printers in a given area for the purpose of a move, replacement, or the like. In this case, the printer manager can select and delete each printer from the printer management screen of the print service by the above-described method. In this method, however, the larger the number of printers is, the heavier the burden on the printer manager is, and the higher the possibility of deletion errors is. Embodiments for carrying out the present invention will now be described with reference to the accompanying drawings.

[First Embodiment]

Figure 1:
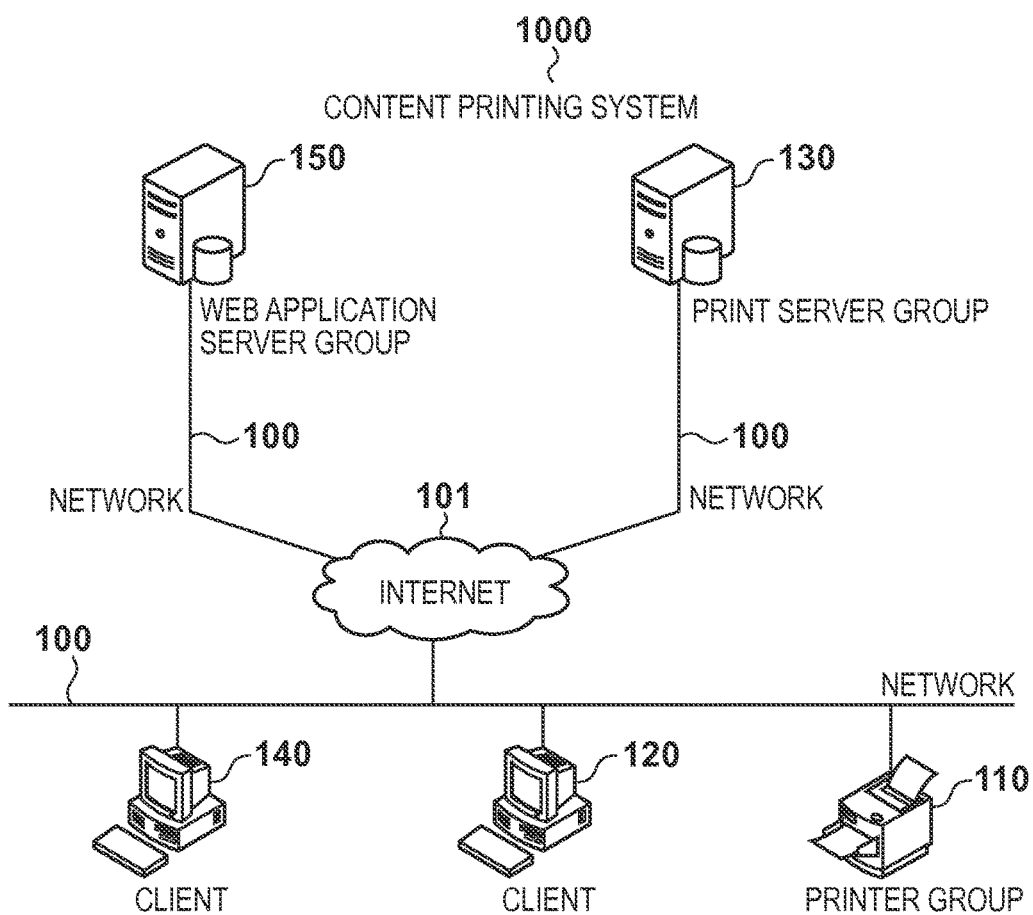
FIG. 1 is a view showing the arrangement of a content printing system 1000.

The arrangement of a content printing system 1000 according to the first embodiment, which prints content data of a document or the like, will be described first. FIG. 1 is a view showing the arrangement of the content printing system 1000 that is an example of an information processing system. The content printing system 1000 includes clients 120 and 140 which are implemented by information processing apparatuses, that is, computers and can be operated by users, and a printer group 110. The content printing system 1000, the client 120, the client 140, and the printer group 110 are arranged in a user environment and connected to each other via a network 100. The network 100 is connected to the Internet 101. The content printing system 1000 also includes a Web application server group 150 and a print server group 130. The two server groups may be provided by a single vendor. In this case, the server groups may be connected via the network 100. The apparatuses and servers included in the content printing system 1000 can be connected and communicate data to each other via the Internet 101. Note that each of the client 120 and the client 140 may include a plurality of clients. Each of the printer group 110, the Web application server group 150, and the print server group 130 may include only one apparatus, although each group is formed from a plurality of apparatuses. The printer group 110 may be communicably connected to only the client 120.

Figure 2:
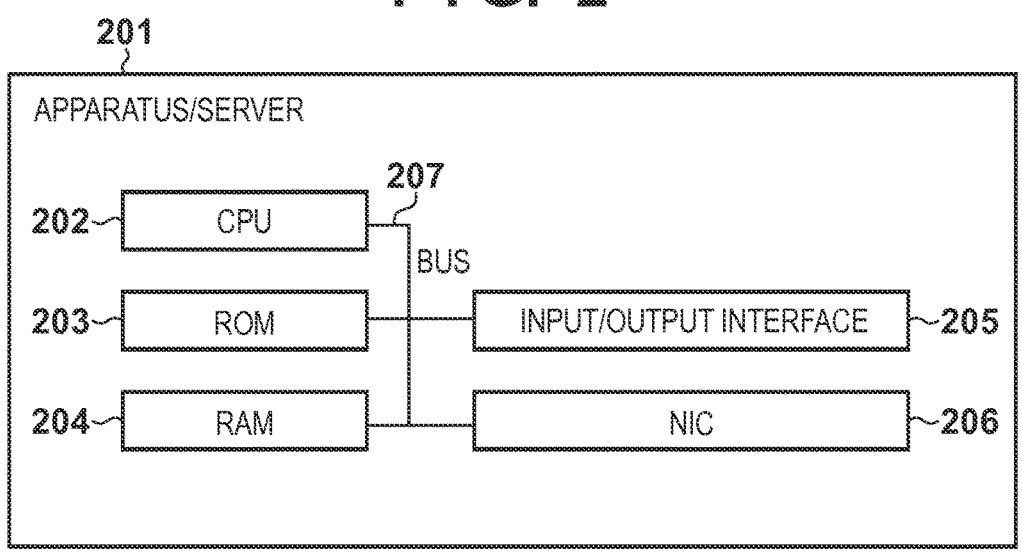
FIG. 2 is a block diagram showing the hardware arrangement of each apparatus or server included in the content printing system 1000.

The hardware arrangement of each apparatus/server included in the printing system 1000 will be described next. FIG. 2 is a block diagram showing the hardware arrangement of each apparatus or server included in the printing system 1000. Reference numeral 201 denotes each apparatus or server included in the printing system 1000. A CPU (Central Processing Unit) 202 is a unit that executes various kinds of programs and implements various functions. A ROM (Read Only Memory) 203 is a unit that stores various kinds of programs. Reference numeral 204 denotes a RAM (Random Access Memory). The CPU 202 loads the programs stored in the ROM 203 to the RAM 204 and executes them. The RAM 204 is a unit that is also used as the temporary working storage area of the CPU 202. An Input/Output interface 205 is an interface unit that transmits data to a display (not shown) connected to each apparatus or server and also receives data from a pointing device (not shown). A NIC (Network Interface Card) 206 is a unit that connects each apparatus or server included in the printing system 1000 to the network 100. The above-described units can transmit/receive data through a bus 207. Each print control unit included in the printer group 110 is equipped with a printing unit (not shown). The printing unit can transmit/receive data to/from each unit through the bus 207. Note that the printing unit can print a raster image on a printing medium.

<Software Configuration>

Figure 3:
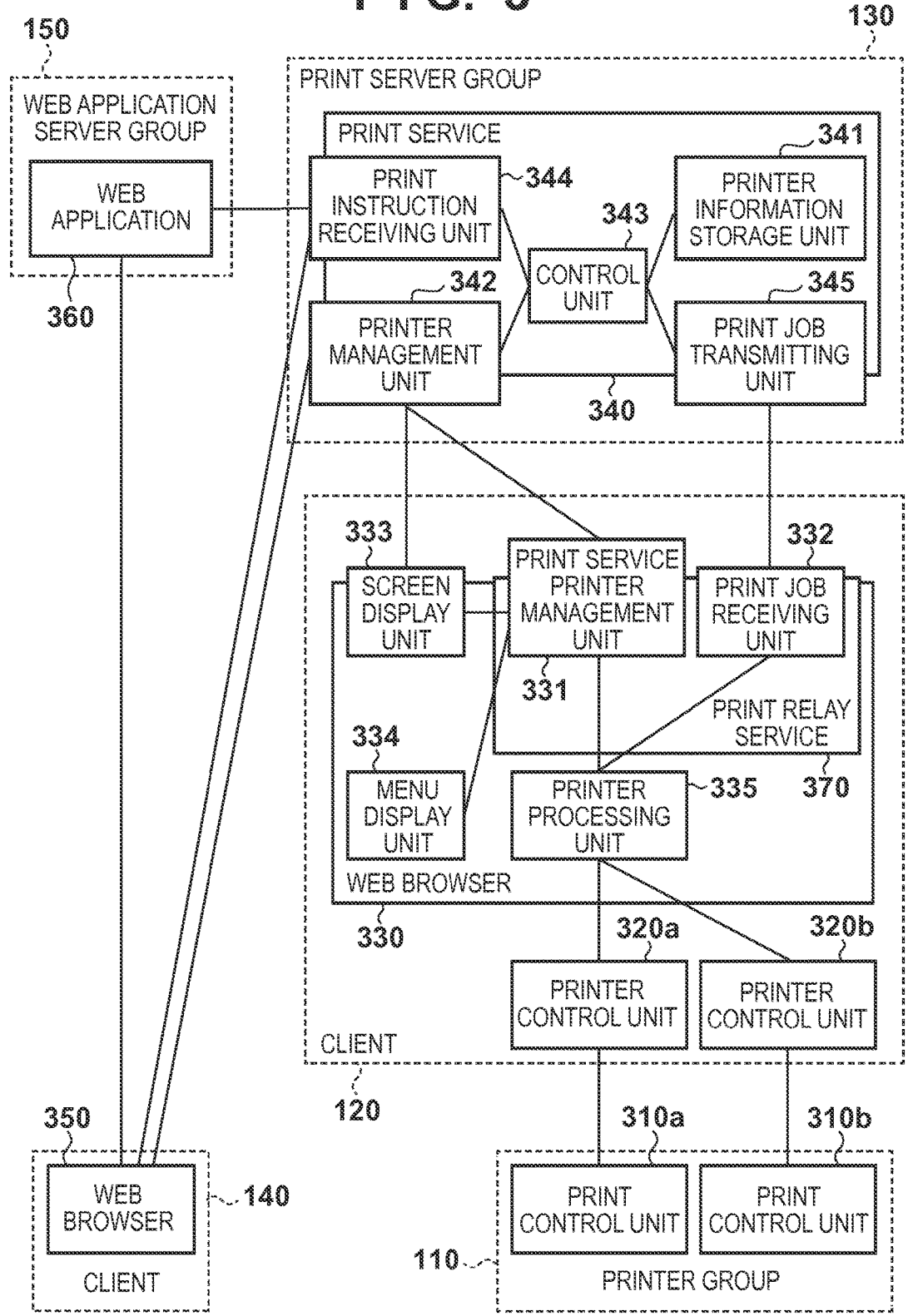
FIG. 3 is a block diagram showing the software configuration of each apparatus or server included in the content printing system 1000.

The software configuration of each apparatus or server included in the content printing system 1000 will be described next. FIG. 3 shows the software configuration of each apparatus or server included in the content printing system 1000. A program for implementing the functions of the software components shown in FIG. 3 is stored in the ROM 203 of each apparatus or server. The CPU 202 loads the program to the RAM 204 and executes it, thereby implementing the functions.

The print server group 130 virtualizes a plurality of servers and regards them as one server. The one virtual server implements the functions of a print service 340. Note that the print server group 130 activates a plurality of virtual machines in the one server, and causes each virtual machine to implement the functions of the print service 340. The print service 340 shown in FIG. 3 represents one of the virtual machines.

The client 120 includes a Web browser 330 and printer control units 320*a* and 320*b*. A print relay service 370 is incorporated in the Web browser 330. The print relay service 370 can communicate with the print service 340 and registers a service printer or receives a print job. The printer control units 320*a* and 320*b* exist in correspondence with print control units 310*a* and 310*b* included in the printer group 110, respectively. The printer control units 320*a* and 320*b* hold printer information (for example, printer name, capabilities, and print setting default values) of the print control units 310*a* and 310*b* and transmit a print job to the print control units 310*a* and 310*b*, respectively. In FIG. 3, the printer group 110 includes the two print control units 310*a* and 310*b*. The number of print control units may be one or two or more. The number of printer control units may also be one or two or more because the printer control units 320*a* and 320*b* exist in correspondence with the print control units 310*a* and 310*b*. Note that one of the print control units 310*a* and 310*b* included in the printer group 110 will be referred to as a print control unit 310. Similarly, one of the printer control units 320*a* and 320*b* will be referred to as a printer control unit 320.

The functions of each apparatus or server will be described below. The functions of the print service 340 of the print server group 130 will be explained first. The print service 340 includes a printer information storage unit 341, a printer management unit 342, a control unit 343, a print instruction receiving unit 344, and a print job transmitting unit 345. Each of the printer management unit 342, the print instruction receiving unit 344, and the print job transmitting unit 345 includes a communication module, and can perform data communication with communication modules included in the Web browsers 330 and 350. In this embodiment, assume that service printers are already registered in the print service 340. A service printer is an instance for printer selection and is associated with a real printer. This corresponds to a print queue in a printing system of Windows®. Service printer registration starts when the print control unit 310 or the print relay service 370 requests the print service 340 to register a printer. A unique service printer is generated for each requested printer or print relay service or for each user account. Hence, different service printers are generated from a single real printer when it is registered by different users or different print relay services.

In this embodiment, the service printers registered in the print service 340 are assumed to have been registered from the print relay service 370. When registering a service printer from the print control unit 310 or the print relay service 370 to the print service 340, the user needs to log in to the print service 340. The login is done by displaying a login screen acquired from the print service 340 on a screen display unit 333 and using a user account and password the user has input there. Alternatively, if the user has already logged in before, the login may be done using information stored by the print control unit 310 or the print relay service 370. The user account and password are issued and managed by the print service 340. The user who has logged in to the print service 340 upon registering the service printer in the print service 340 is the manager of the service printer (to be referred to as a printer manager for short hereinafter). The printer manager can set another reliable user account to share the registered service printer. When a user set to share (to be referred to as a share user for short hereinafter) displays the printer management screen of the print service 340 from the Web browser 350, a message to select whether to approve share of the service printer set to share is displayed. When the user approves, the account of the user set to share is linked with the service printer, and the share user can transmit a print job to the service printer. When the share user displays the printer management screen of the print service 340 on the Web browser 350, shared service printers are displayed in a printer list.

The printer information storage unit 341 stores the information of each registered service printer. The printer information storage unit 341 stores an SPID (service printer ID), the user account of the printer manager, a printer name, a proxy ID, an RPID (real printer ID), capabilities, print settings initial values, a status, and the user account of a share user in association with each other. FIG. 14A is a view showing an example of information stored in the printer information storage unit 341.

An SPID 1401 is issued by the print service 340 at the time of printer registration. The print service 340 identifies each service printer by the SPID.

A printer manager 1402 is the user account of a user who has registered a printer, that is, the user account of a printer manager.

A printer name 1403 is a name assigned to the print control unit 310 and used when calling the print control unit 310. Note that the printer name of each printer is not always unique, unlike the identification information.

A proxy ID 1404 is identification information issued to uniquely identify the interface (in this embodiment, the print relay service 370) through which the print service 340 has registered a printer. When the printers are registered from interfaces having different proxy IDs, management is done such that each user can know which printer has been registered from which interface. That is, in this embodiment, the print relay service 370 corresponds to a proxy service.

An RPID 1405 is unique identification information assigned to each printer (a real printer, that is, a printer as an apparatus). When a printer is registered from a print relay service, the print relay service can identify the printer by the RPID 1405. In this embodiment, specifying the proxy ID and the RPID enables to specify the print relay service 370 and the arrangement position of the print control unit 310 linked with it.

Capabilities 1406 include the capability information of the print control unit 310 representing, for example, whether the print control unit 310 is capable of double-sided printing and color printing and the outputtable paper sizes. The feasibilities of paper sizes, double-sided printing, and the like are determined by the mechanism of the printer. However, these capabilities are grasped by the print control unit 310 and will therefore be referred to as the capabilities of the print control unit 310. The capabilities will also be referred to as the capabilities of the printer. The capabilities 1406 can be expressed by the XML format, as shown in FIG. 15A. The capabilities 1406 are put between <Capabilities> tags. <Item> tags represent the capabilities of the print control unit 310. FIG. 15A shows that the print control unit 310 can perform double-sided printing as for the double-sided printing function (<Duplex> tag), perform color output as for the color printing function (<Color> tag), and output B5, A4, and A3 paper sheets as for the paper sizes (<PaperSize> tag).

A print setting initial value 1407 indicates the initial values of print settings. As shown in FIG. 15B, the print setting initial values can be expressed by the XML format. The print setting initial values are put between <PrintSettings> tags. The setting of each function is described between the tags. Each function is a subset of the capabilities 1406, and one <Item> is selected for each function. The example shown in FIG. 15B indicates that single-sided output, color output, and A4 size are set for the respective functions.

A status 1408 represents the state of a printer. For example, the status is "online" for an available state, "offline" for an unavailable state, and "error" if an error has occurred. In the example shown in FIG. 14A, all printers have the status "online" representing the available state.

A share user 1409 is the user account of a share user, that is, the user account of a user set to share a service printer. An example of the service printer information stored in the printer information storage unit 341 has been described above.

Upon receiving a request to acquire a list of printers linked with a user account from the print relay service 370 or the Web browser 350, the printer management unit 342 generates a list of printers linked with the user account of the request source and transmits the list. Since two types of user accounts of the printer manager 1402 and the share user 1409 are registered as the printer information, printers having the designated user account registered as one of the user accounts are included in the list. The printer list is generated by specifying the SPID and printer name stored in the printer information storage unit 341 based on the user account.

Upon receiving a printer management screen acquisition request from the Web browser 350, the printer management unit 342 generates a printer management screen based on the list of printers linked with the user account of the request source and transmits the printer management screen to the Web browser 350. The user can confirm the printer name, print job queue state, and status of each service printer through the printer management screen displayed on the Web browser 350. The user can also instruct to delete a service printer.

Upon receiving a request to acquire a list of printers linked with a proxy ID from the print relay service 370, the printer management unit 342 generates a list of printers linked with the proxy ID of the request source and transmits the list. The printer list is generated by specifying the SPID and printer name stored in the printer information storage unit 341 based on the proxy ID.

Upon receiving a print setting screen request from the Web browser 350, the printer management unit 342 requests the control unit 343 to generate the print setting screen. The print setting screen request includes the SPID of the printer selected by the user from the printer list at the time of printing. The control unit 343 specifies the capabilities stored in the printer information storage unit 341 based on the received SPID, and generates the print setting screen from the information of the specified capabilities. The print setting screen displays only the print settings described in the capabilities. The control unit 343 returns the generated print setting screen to the printer management unit 342, and the printer management unit 342 transmits the print setting screen to the Web browser 350. In addition, the print setting initial values stored in the printer information storage unit 341 are specified based on the received SPID and set as the initial values of settings.

The print instruction receiving unit 344 receives the SPID and the print settings set via the print setting screen from the Web browser 350. The print instruction receiving unit 344 also receives content identification information used to identify the content instructed by the user to print when the Web browser 350 accesses based on a redirect instruction. The print instruction receiving unit 344 acquires the print target content from a Web application 360 based on the received content identification information. The print instruction receiving unit 344 also receives the print settings input by the user and the SPID corresponding to the printer selected by the user. Note that the print instruction receiving unit 344 may convert content into print data as needed based on the print settings and the content acquired from the Web application 360.

The print job transmitting unit 345 acquires the print data, print settings, and SPID from the print instruction receiving unit 344 via the control unit 343, and based on them, generates a print job in the print job queue of the service printer corresponding to the SPID. The print job transmitting unit 345 transmits a print request notification representing the print data is ready to the print job receiving unit of the service printer (in this embodiment, a print job receiving unit 332 of the print relay service 370 specified by the proxy ID).

Upon receiving a print job acquisition request from the print job receiving unit 332 of the print relay service 370, the print job transmitting unit 345 transmits the print job.

<Disabling of Service Printer>

A function of disabling the status of a service printer registered in the print service 340 will be described.

The printer management unit 342 receives a printer disabling request from a print service printer management unit 331 of the print relay service 370. If the printer group 110 linked with the print relay service 370 includes a plurality of printers, disabling requests for the plurality of printers are received. FIG. 15C shows an example of the printer disabling request received by the printer management unit 342. The information (Update tag) described by XML includes the SPID described between id tags, the printer name described between name tags, the proxy ID described between proxy tags, and a disabled status "offline" described between status tags as the status value after update. Although the SPID, printer name, proxy ID, and disabled status are described here, the SPID of the service printer to be disabled and the disabled status as the status after updated suffice. In addition, pieces of information of a plurality of printers may be received at once by one-time reception.

Upon receiving the disabling request, the printer management unit 342 requests the control unit 343 to change the status of the service printer of each SPID to the disabled status (offline). The control unit 343 changes the status of the service printer of each SPID stored in the printer information storage unit 341 to the disabled status. FIG. 14B is a view showing an example of information stored in the printer information storage unit 341 after the status of the service printer having the SPID="5842" registered from the print relay service having the proxy ID="Proxy-A" has been changed to the disabled status. The status 1408 of the service printer having the SPID="5842" has the value "offline" indicating the disabled status. When requests to disable a plurality of printers are received from the print relay service 370, the above-described processing is repeated as many times as the number of the plurality of designated printers. FIG. 14C is a view showing an example of information stored in the printer information storage unit 341 after the statuses of four service printers (SPID="5842", "1506", "5126", "1912") linked with the print relay service having the proxy ID="Proxy-A" have been changed to the disabled status. The status 1408 of the service printers having the SPID="5842", "1506", "5126", "1912" has the value "offline" indicating the disabled status. The status of each service printer requested to disable is thus changed to the disabled status.

<Notifying Associated User of Disabled Service Printer>

Figure 5:
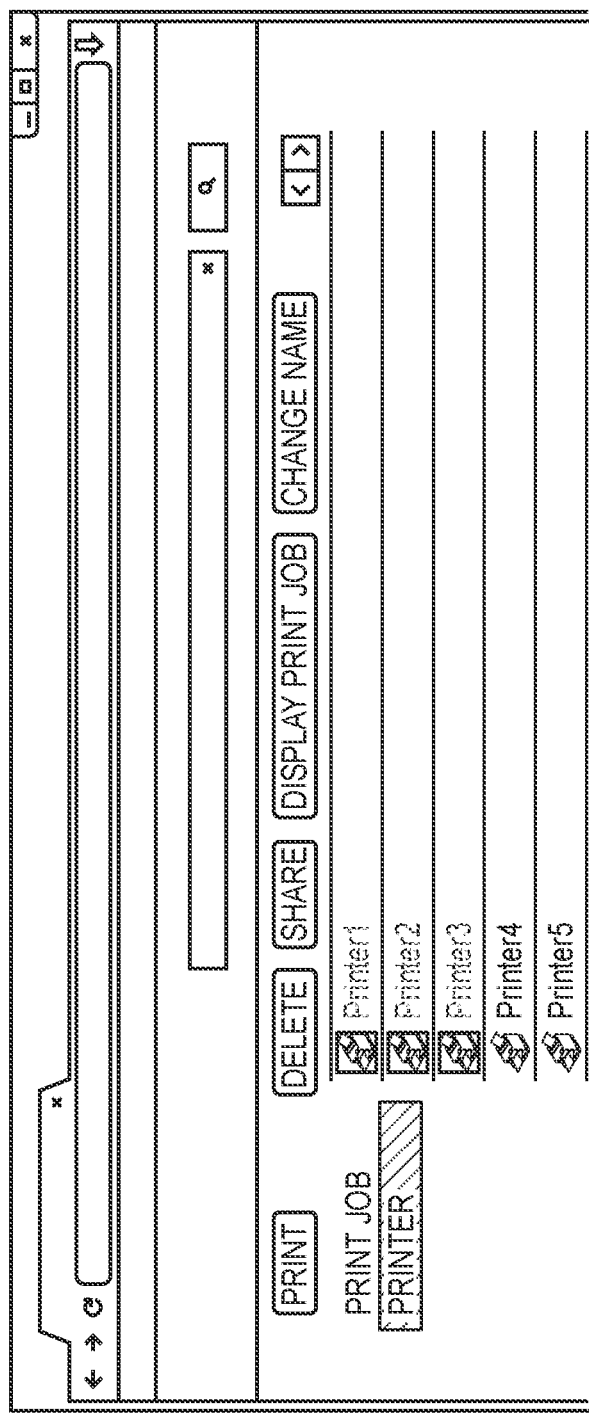
FIG. 5 is a view showing a printer management screen UI after disabling.
Figure 6:
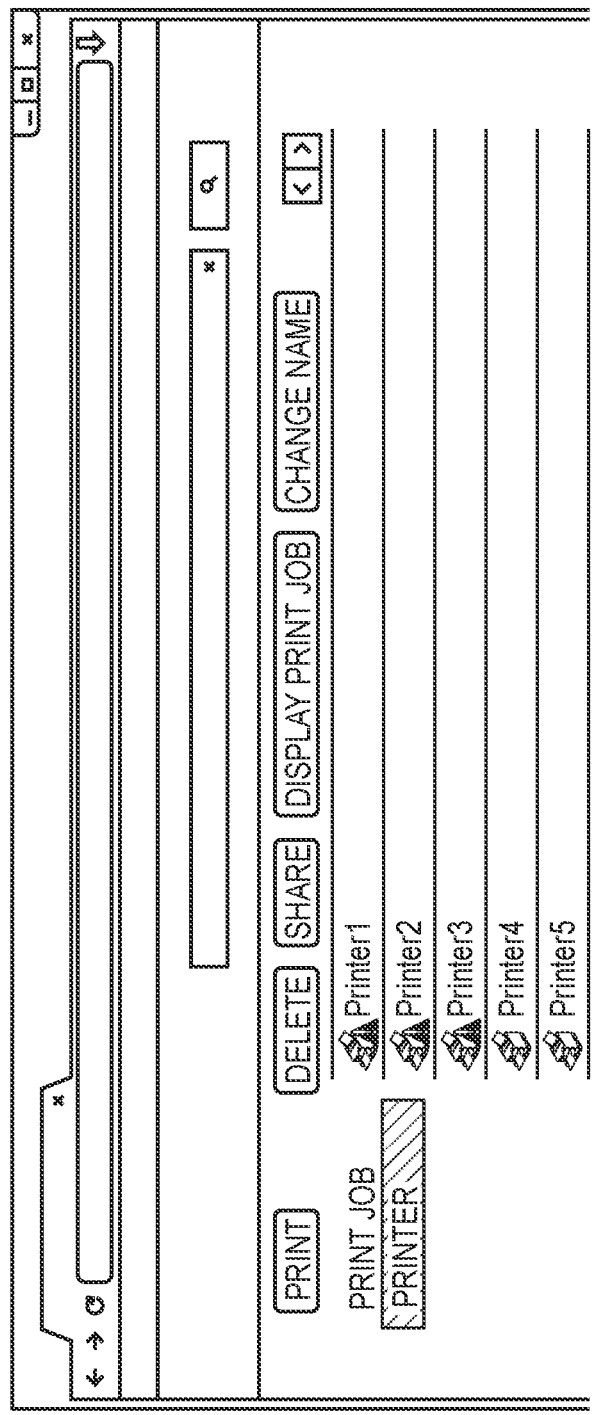
FIG. 6 is a view showing the printer management screen UI after disabling.
Figure 7:
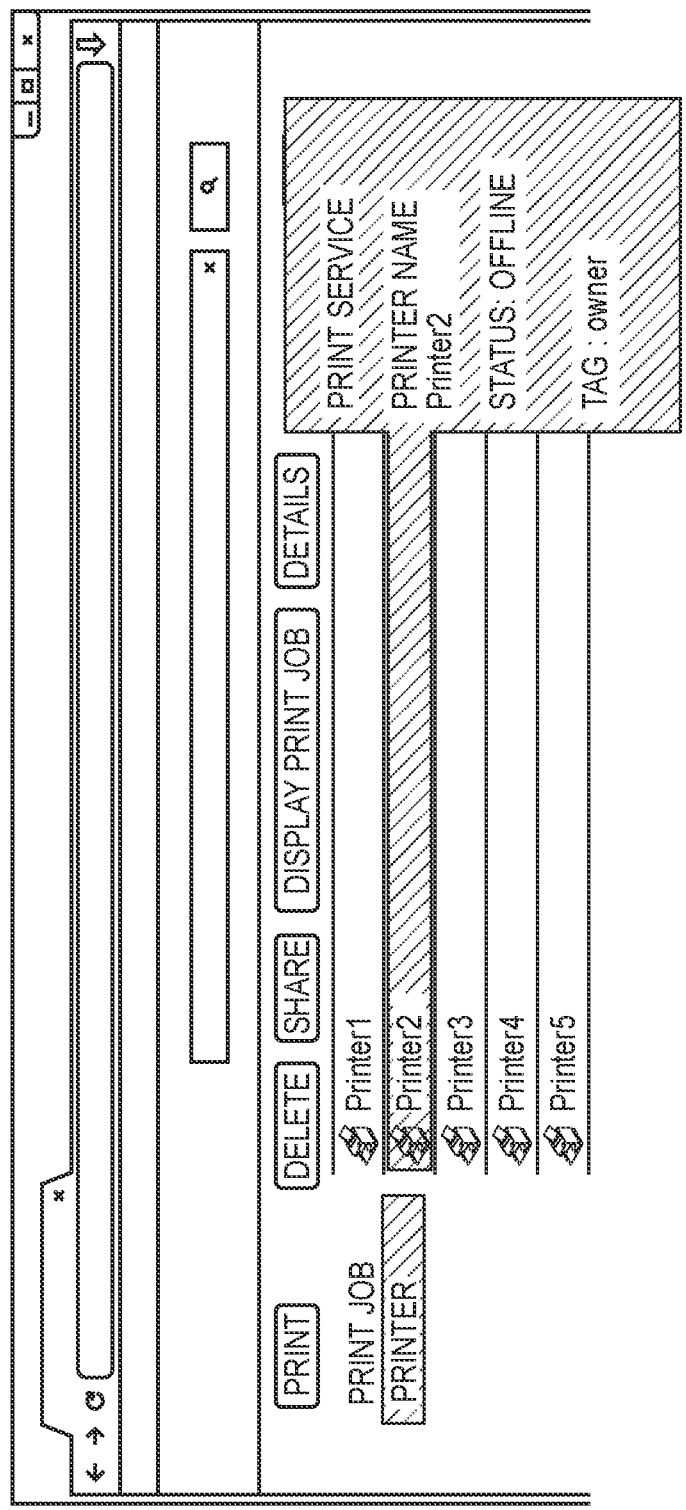
FIG. 7 is a view showing the printer management screen UI after disabling.
Figure 8:
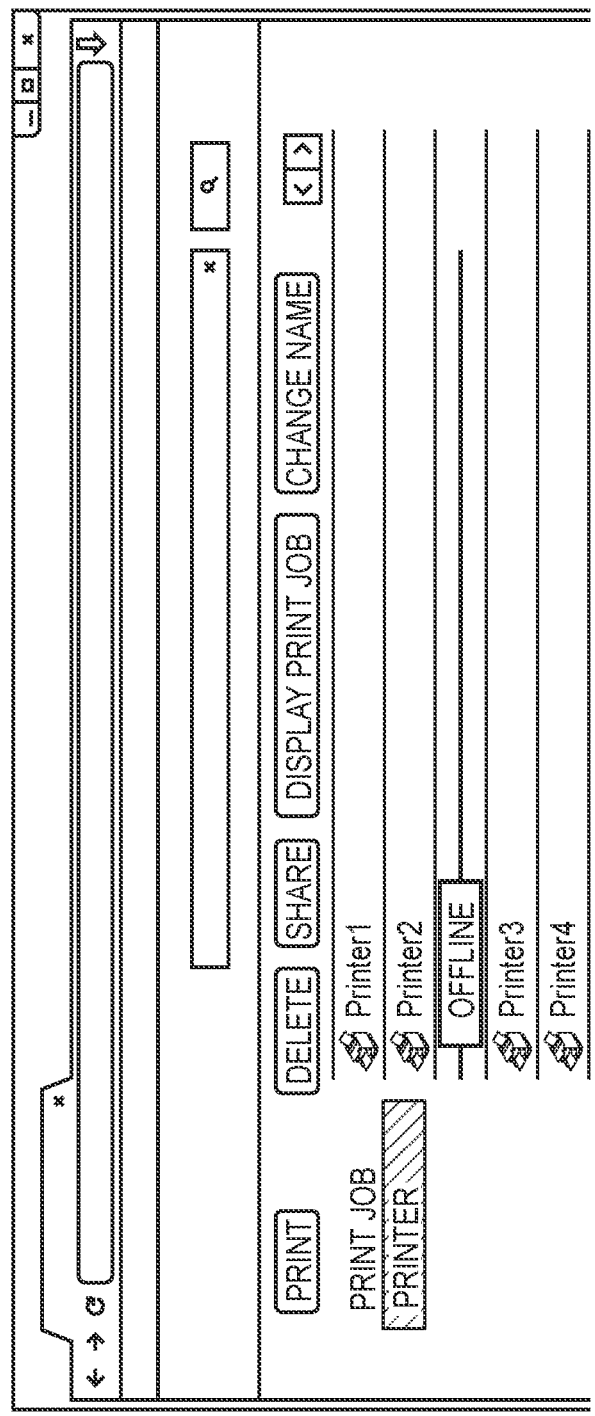
FIG. 8 is a view showing the printer management screen UI after disabling.
Figure 9:
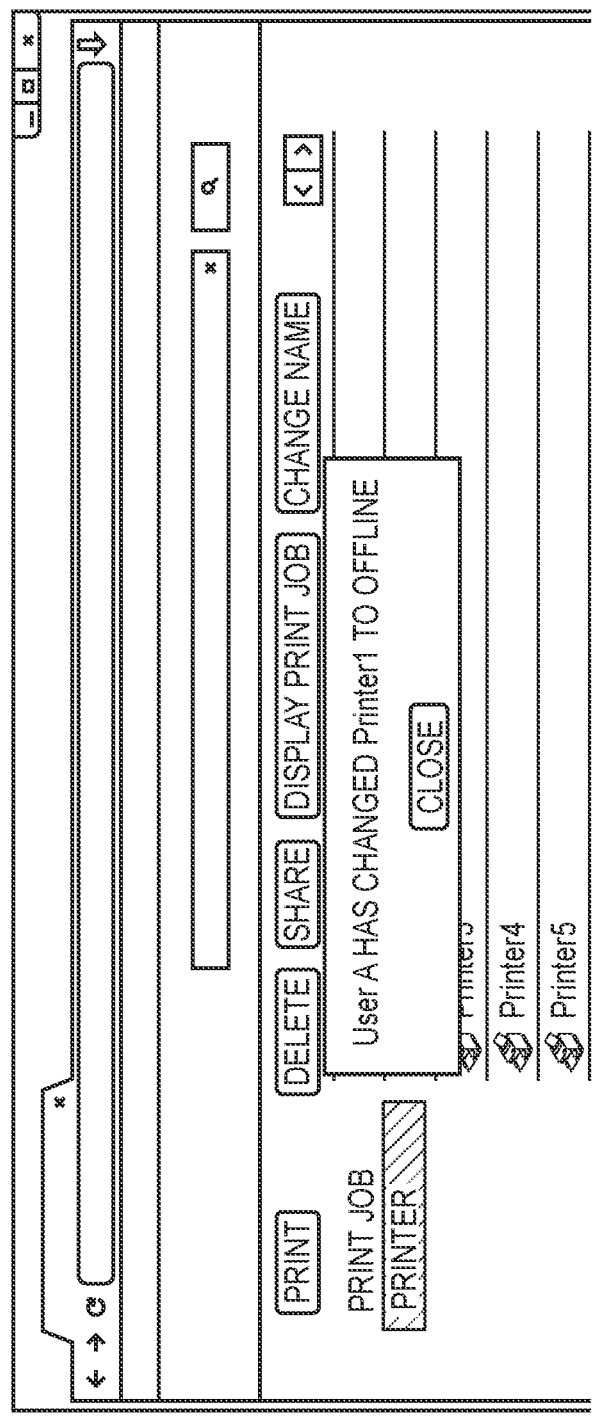
FIG. 9 is a view showing the printer management screen UI after disabling.
Figure 10:
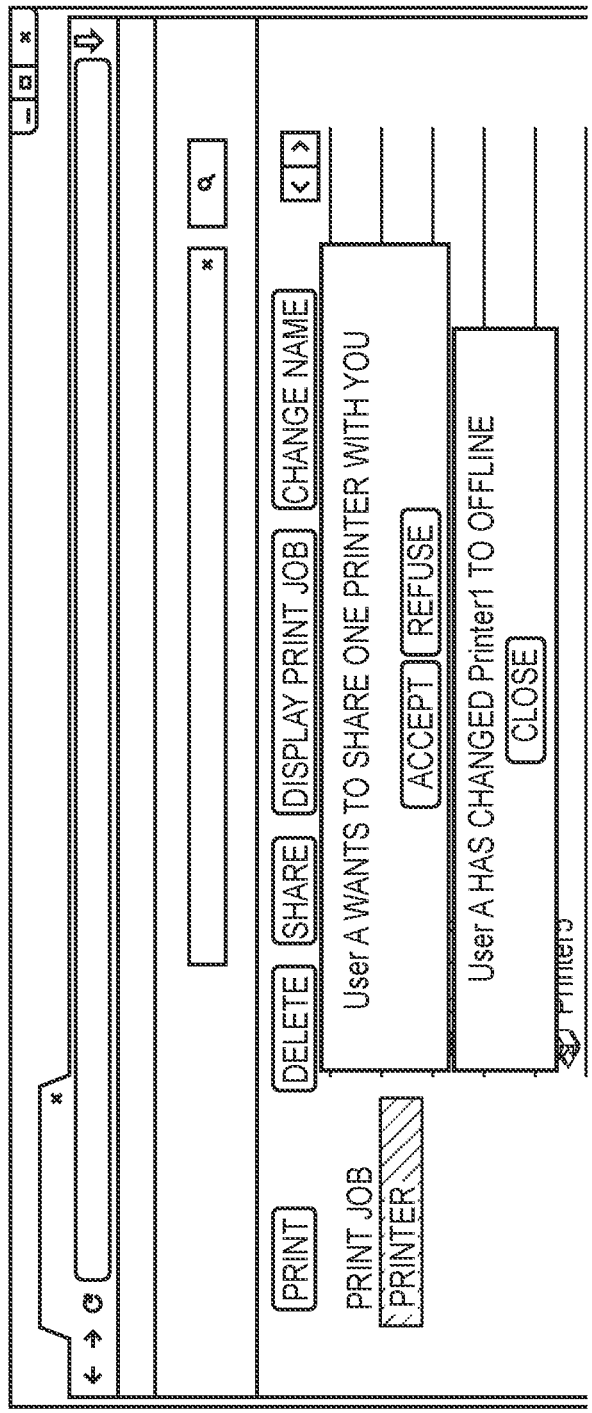
FIG. 10 is a view showing the printer management screen UI after disabling.

After the status of a service printer has been changed to the disabled status, upon receiving a printer management screen acquisition request from the Web browser 350 of the client 140, the printer management unit 342 displays the service printer of the disabled status such that the user can recognize that the service printer is disabled. The share user or printer manager of the service printer can thus recognize the disabled service printer when the printer management screen of the print service 340 is displayed from the Web browser 350. FIGS. 5 to 10 show examples. FIG. 5 shows an example of the printer management screen in which printers (Printer1, Printer2) of the disabled status are grayed out. FIG. 6 shows an example of the printer management screen in which an icon representing the disabled status is displayed for each printer of the disabled status. FIG. 7 shows an example of the printer management screen in which "offline" representing the disabled status is displayed in the status field of the detailed information dialogue of a printer. The screen shown in FIG. 7 is displayed for a selected printer by, for example, selecting the printer from the printer management screen and displaying a "details" button. FIG. 8 shows an example of the printer management screen in which an offline printer is classified and displayed. FIG. 9 shows an example of the printer management screen in which a printer whose status has been changed to the disabled status is notified by a message. When the statuses of a plurality of printers have been changed to the disabled status, the plurality of printer names are displayed. FIG. 10 shows an example of the printer management screen in which both a message representing that a printer is to be set to share and a message representing that the status has been changed to the disabled status are displayed. A printer list may simultaneously be displayed together with these pieces of information, as a matter of course.

Figure 11:
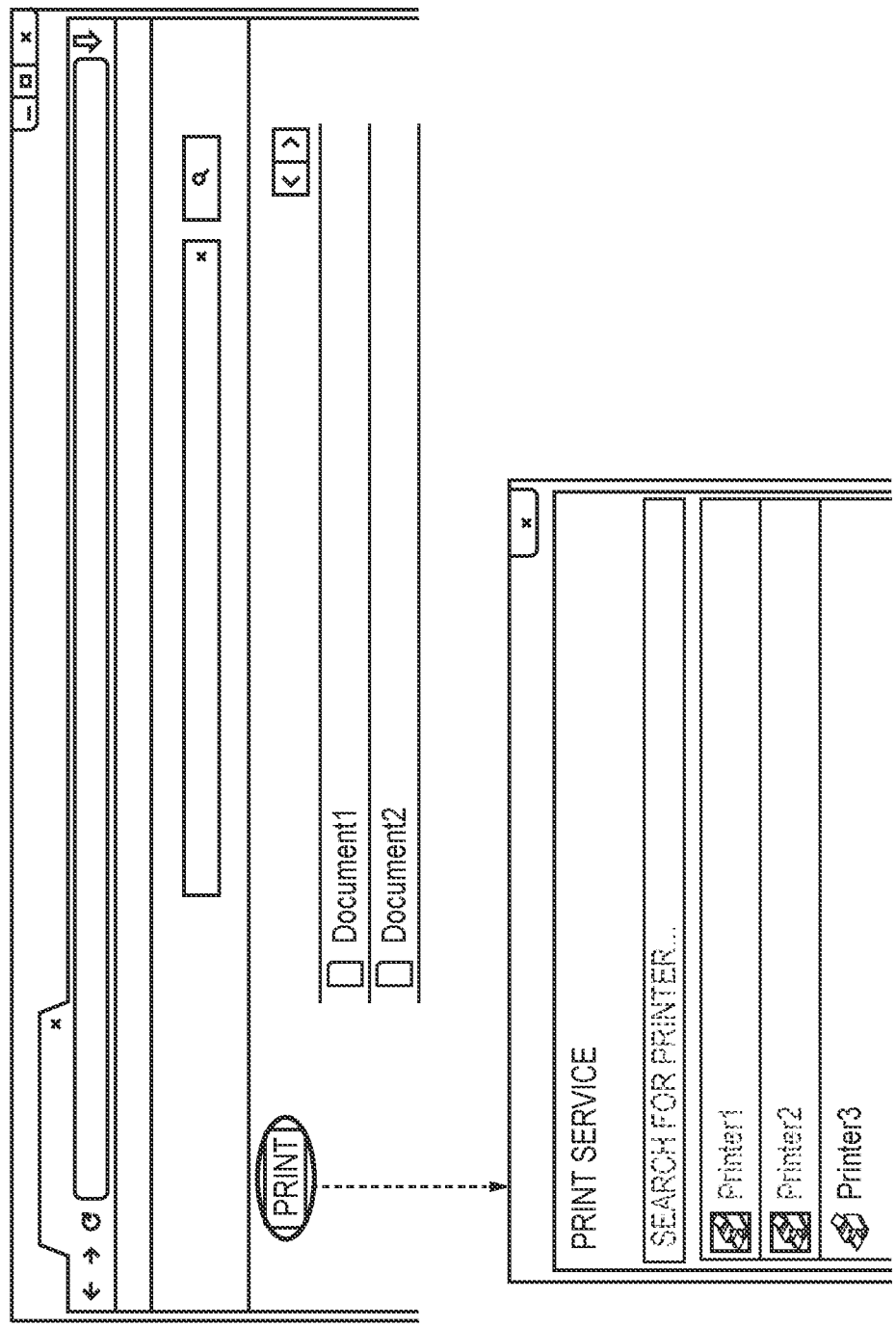
FIG. 11 is a view showing a printing printer selection screen UI after disabling.

Upon receiving the request to acquire a list of printers linked with a user account from the Web browser 330 or the Web browser 350, the printer management unit 342 may exclude printers of the disabled status from the list of the printers linked with the user account. Alternatively, the printer management unit 342 may transmit a list including the printers while setting the status to the disabled status, so as to allow the Web browser 330 or the Web browser 350 to recognize the printers of the disabled status or prohibit the Web browser from selecting the printers in the printer selection screen at the time of printing. FIG. 11 shows an example of the printer selection screen displayed by the Web browser 330 or the Web browser 350 at the time of printing in which printers (Printer1, Printer2) of the disabled status are grayed out to prohibit the user from selecting them.

The printer management unit 342 may notify the share user or printer manager by mail that the status of a service printer has been changed to the disabled status. The mail address is acquired from the printer information storage unit 341. For example, user information including a mail address is saved for each user in association with a user ID, and the mail address is acquired from there. FIG. 12 shows an example of mail that notifies the share user of a service printer that the status of the service printer has been changed to the disabled status. A text is created by merging the user ID of the share user of the destination, the SPID of the service printer, and the user ID of the manager with a form text and notified as mail. Note that the status "offline" after the change can be permanent solely for the purpose of disabled status notification. However, to notify an enabled status by mail as well, the status after the change may be merged even here to form a text.

<Functions of Client Including Print Relay Service 370>

The functions of the Web browser 330 and the printer control unit 320 included in the client 120 will be described next. The print relay service 370 is incorporated in the Web browser 330.

The function of the Web browser 330 in the client 120 will be explained first. The Web browser 330 includes the print service printer management unit 331 and the print job receiving unit 332 in the print relay service 370, the screen display unit 333, a menu display unit 334, and a printer processing unit 335. Each of the print service printer management unit 331 and the print job receiving unit 332 in the print relay service 370, and the screen display unit 333 includes a communication module complying with the scheme of communication with the print service 340. The communication module corresponds to an interface for performing communication with the print service 340 and can communicate with the communication module provided in the print service 340.

The print relay service 370 in the Web browser 330 registers a printer in the print service 340. Assume that printing from the print service 340 to the printer registered by the print relay service 370 is possible.

The printer manager instructs printer registration on the menu display unit 334, and the print service printer management unit 331 transmits printer registration information to the printer management unit 342 of the print service 340, thereby registering a printer. To transmit the printer registration information, the user needs to log in to the print service 340. The printer is linked with the user account of the user who has logged in and registered. The printer registration information includes the printer name, proxy ID, capabilities, print setting initial value, and status. FIG. 15D shows an example of printer registration information transmitted to the print service 340. The printer name, proxy ID, capabilities, print setting initial value, and status are included in the information described by XML. Information of one printer is described here. However, pieces of information of a plurality of printers may be transmitted at once by one-time transmission. The printer processing unit 335 acquires the printer registration information from the printer control unit 320 corresponding to each printer included in the printer group 110.

As a result of printer registration information transmission, the print service printer management unit 331 receives an SPID corresponding to each printer from the print service

340. The print service printer management unit 331 records each received SPID in association with the printer control unit 320 of the corresponding printer.

After the print relay service 370 of the Web browser 330 registers the printer in the print service 340, the print job receiving unit 332 requests the print job transmitting unit 345 to acquire a print job in response to a print request notification received from the print job transmitting unit 345. Alternatively, the Web browser periodically confirms, with the print job transmitting unit 345, the presence of a print job of the registered printer. Upon confirming the presence of a print job, the print job receiving unit 332 requests the print job transmitting unit 345 to acquire the print job. The print job confirmation or acquisition request is done by sending the SPID as an argument, thereby confirming or requesting to acquire the print job spooled in the print job queue of the service printer corresponding to the SPID. Upon receiving the print job from the print job transmitting unit 345 as the result of the print job acquisition request, the printer processing unit 335 transmits the print job to the printer control unit 320 corresponding to the SPID.

A function of, on the Web browser 330, disabling printing from the print service 340 to the printer registered by the print relay service 370 of the Web browser 330 will be described.

<Function of Disabling Printing to Printer>

Figure 4:
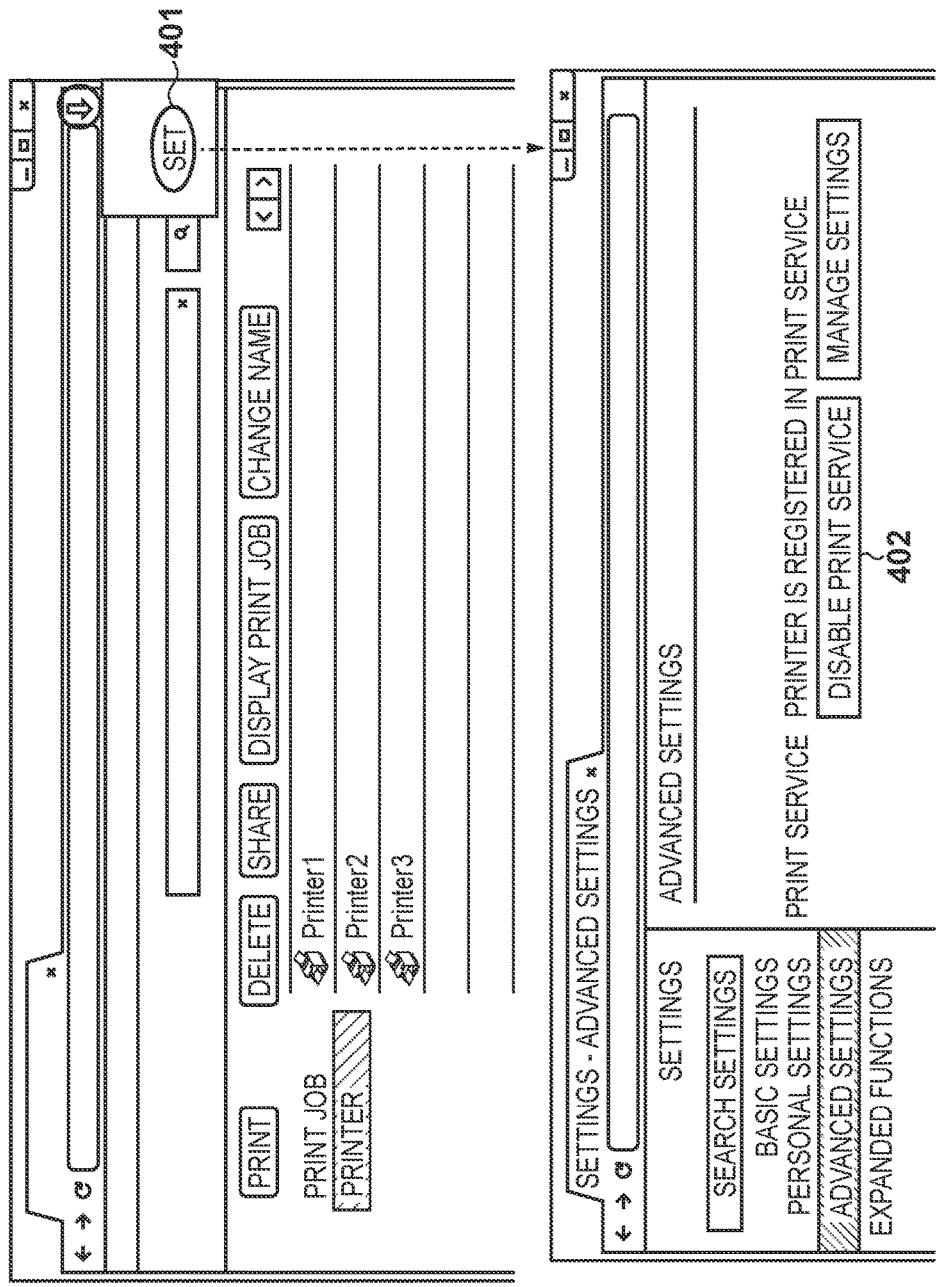
FIG. 4 is a view showing a UI used to disable a print service on a Web browser 330.

The menu display unit 334 of the Web browser 330 receives an instruction to disable printing from the print service 340. FIG. 4 shows an example of the screen of the menu display unit 334 that receives the instruction to disable printing from the print service 340. A button 402 used to instruct to disable printing from the print service 340 is displayed in a setting screen displayed by selecting a setting menu 401.

When the button 402 is pressed, and the instruction to disable printing from the print service 340 is received from the menu display unit 334, the print service printer management unit 331 requests the print job receiving unit 332 to stop the print job reception request. Upon receiving the request, the print job receiving unit 332 stops acquiring print jobs from the print job transmitting unit 345 of the print service 340. As a result, printing from the print service 340 to all printers registered by the print relay service 370 is not executed anymore. In this way, print job acquisition from the print service 340 is stopped first. Then, printing by the service printers registered by the print relay service 370 is stopped.

Next, the print service printer management unit 331 requests the printer processing unit 335 to acquire the SPID of a printer recorded when the print relay service 370 has registered the printer in the print service 340 and corresponding printer information (printer name, proxy ID, capabilities, and print setting initial value).

The printer processing unit 335 acquires the printer information (printer name, proxy ID, capabilities, and print setting initial value) from the printer control unit 320 of the printer corresponding to each SPID. This processing is repeated as many times as the number of printers registered in the print service 340. The acquired printer information corresponding to the SPID of each printer is returned to the print service printer management unit 331.

The processing of acquiring the SPID, printer name, proxy ID, capabilities, and print setting initial value of each printer registered by the print relay service 370 can also be performed by acquiring the list of the printers registered by the print relay service 370 from the print service 340. The printer list acquisition request is sent to the print service 340 using the proxy ID of the print relay service 370 as an argument, thereby acquiring the list of printers linked with the proxy ID.

Next, the print service printer management unit 331 logs in to the print service 340. The login is done by displaying a login screen acquired from the print service 340 on the screen display unit 333 and using a user account and password the user has input there. Alternatively, if the user has already logged in before, the login may be done using information stored by the print service printer management unit 331. When the login has succeeded, the print service printer management unit 331 requests the printer management unit 342 of the print service 340 to disable the status of the printer using the printer information acquired above.

The printer disabling request is done by sending the disabled status "offline" from the print service printer management unit 331 to the printer management unit 342 in addition to the SPID, printer name, proxy ID, capabilities, and print setting initial value of each printer acquired above. FIG. 15C shows an example of the printer disabling request transmitted by the print service printer management unit 331. The information described by XML includes the SPID, printer name, proxy ID, and disabled status of each printer to be disabled. Although the SPID, printer name, proxy ID, and disabled status are described here, the SPID and the disabled status suffice. When a plurality of printers are registered in the print service 340, disabling requests for the plurality of printers are sent. The requests for the plurality of printers may be transmitted at once by one-time transmission.

The status of the printer registered in the print service 340 by the print relay service 370 of the Web browser 330 is thus changed to the disabled status.

Figure 13:
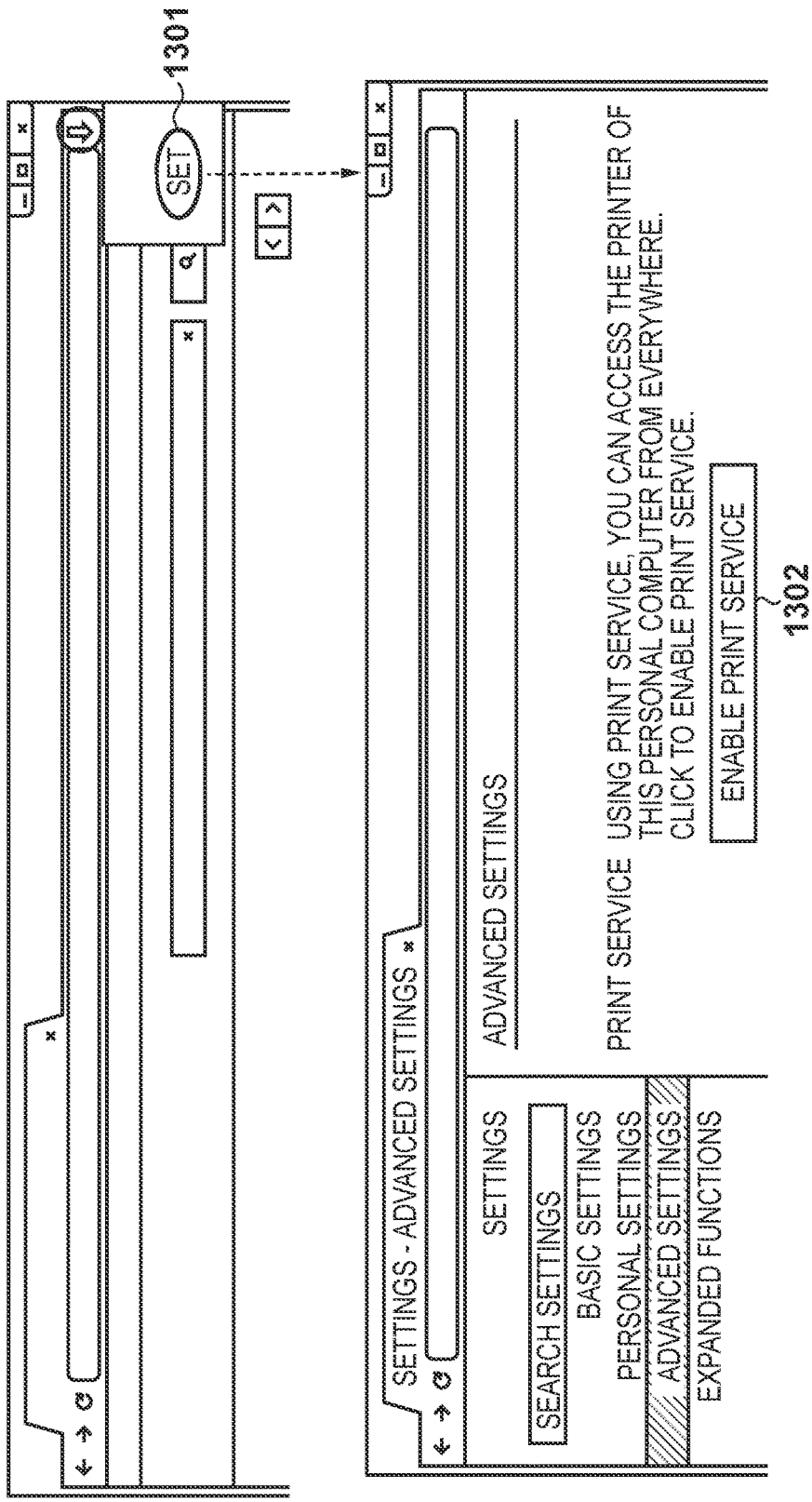
FIG. 13 is a view showing a UI used to enable the print service on the Web browser 330.

Finally, the menu display unit 334 updates the menu display. In a state in which print job transmission from the print service 340 to the print relay service 370 is stopped, and the service printers registered by the print relay service 370 are disabled, the screen of the menu display unit 334 includes the disabling button 402, as shown in FIG. 4. This display is changed to a state representing completion of disabling. FIG. 13 shows an example of the updated screen of the menu display unit 334. Since printing from the print service 340 is disabled, a button 1302 used to instruct to enable printing from the print service 340 is displayed in a setting screen displayed by selecting a setting menu 1301.

When the enabling button 1302 displayed on the Web browser 330, as shown in FIG. 13, is pressed, the service printer registered by the print relay service 370 is enabled. The service printer is enabled by, for example, transmitting a request (service printer enabling request) describing "online" in place of "offline" described in the status tag of the message illustrated in FIG. 15C from the print service printer management unit 331 to the printer management unit 342. Upon receiving the enabling request, the printer management unit 342 refers to the printer information, updates the status of the service printer specified by the received enabling request to the designated status, that is, "online". The print job transmitting unit 345 thus resumes print job transmission to the effective service printer.

<Printer Control Unit>

The functions of the printer control unit 320 in the client 120 will be described next. A communication module paired with the communication module implemented in the print control unit 310 is implemented in the printer control unit 320. The printer control unit 320 can transmit notification information interpretable by the print control unit 310 by the communication module. Note that the specifications defined by the device vendor to allow the printer control unit 320 and the print control unit 310 to perform data communication correspond to third specifications and can be handled by the device vendor. The interface of each communication module is created based on the third specifications.

The printer control unit 320 exists in correspondence with each print control unit 310, holds the printer information (printer name, capabilities, print setting initial value, and the like) of the print control unit 310, and transmits a print job to the print control unit 310. The software in the client 120 can acquire the printer information from the printer control unit 320 or transmits a print job to the printer control unit 320 via the interface defined in the client 120. In this embodiment, the printer processing unit 335 of the Web browser 330 acquires printer information from the printer control unit 320 and transmits a print job via the interface.

In this embodiment, the print relay service 370 is incorporated in the Web browser 330 in the client 120 including the printer control unit 320. However, the arrangement is not limited to this. For example, the print relay service may be formed by a server group connected to the Internet without including the Web browser 330 or the printer control unit 320, like the print service 340. This form will be described later in detail in the fifth embodiment.

The functions of the print control unit 310 included in the printer group 110 will be described next.

A communication module paired with the communication module implemented in the printer control unit 320 is implemented in the print control unit 310. The print control unit 310 can receive and interpret notification information transmitted from the printer control unit 320 by the communication module. Note that the specifications defined by the device vendor to allow the printer control unit 320 and the print control unit 310 to perform data communication correspond to third specifications and can be handled by the device vendor. The interface of each communication module is created based on the third specifications.

The print control unit 310 instructs the printing unit to acquire a print job described in the notification information transmitted from the printer control unit 320 and output the acquired print job.

<Web Browser without Proxy Service>

The Web browser 350 provided in the client 140 will be described next. The Web browser 350 receives the data of the printer management screen generated by the print service and displays it. The user can confirm the available service printers or the states of print jobs of the service printers via the printer management screen.

When the user who is using the print service 340 requests, from the Web browser 350, to display the printer management screen of the print service 340 at an arbitrary timing, the Web browser 350 logs in to the printer management unit 342 of the print service 340. The login is done by displaying a login screen acquired from the printer management unit 342 on the Web browser and using a user account and password the user has input there. Alternatively, if the user has already logged in before, the login may be done using information stored by the Web browser 350. When the login has succeeded, the Web browser 350 acquires a list of printers linked with the login user account from the printer management unit 342, particularly, the printer management screen including SPIDs and statuses and displays it.

In the printer management screen, the user can confirm and specify service printers of the disabled status. FIGS. 5 to 10 show examples of the printer management screen. The printer management screen displays a list of service printers managed by the login user and service printers set by other managers to share. In FIGS. 5 to 8, if the status is the disabled status, any service printer is displayed as the disabled status independently of whether it is managed by the login user or set to share. The message in shown FIG. 9 or 10 is preferably notified when a user set to share a service printer of the disabled status has logged in and displayed the printer management screen. However, the message may be notified when a user who is a printer manager has displayed the printer management screen.

The Web browser 350 can also instruct the print server group 130 to print the content saved in the Web application server group 150. After transmitting a print instruction to the Web application server group 150, the Web browser 350 receives a connection instruction, that is, a redirect instruction to the print server group 130 from the Web application server group 150, and connects to the print server group 130 in accordance with the received redirect instruction. The print service 340 acquires, from the print server group 130, a list of printers usable for printing by the user who is using the print service 340, and displays the list on the printer selection screen. At this time, if printers of the disabled status are included in the printers of the list, the printers can be displayed so as to allow the user to recognize the printers of the disabled status or prohibit the user from selecting them. FIG. 11 shows an example of the printer selection screen in which printers of the disabled status are grayed out to prohibit the user from selecting them.

Next, the Web browser 350 acquires a print setting screen corresponding to the printer selected by the user from the printer list in the printer selection screen from the print server group 130 and displays it. When printing is executed on the print setting screen, the Web browser 350 transmits the SPID of the selected service printer and the print setting values set by the user on the print setting screen to the print server group 130 to perform printing.

<Web Application Server>

The functions of the Web application server group 150 will be described next. The Web application server group 150 includes the Web application 360. The Web application server group 150 virtualizes a plurality of servers and regards them as one server. The one server implements the functions of the Web application 360. Note that the Web application server group 150 activates a plurality of virtual machines in the one server, and causes each virtual machine to implement the functions of the Web application 360.

The Web application 360 provides a document creation service. When the user wants to, for example, distribute materials in a company conference, he/she uses the document creation service to create the materials. When the client 140 uses the Web application 360, the client 140 need not install the application but need only include the Web browser 350. The Web application 360 transmits screen information to create the materials to the Web browser 350. Note that the Web application 360 performs login based on a user account and password the user has input via the Web browser 350, and sends the screen information to create the materials in accordance with the success of the login. Upon receiving the screen information, the Web browser 350 displays a creation screen to create a document based on the screen information. The user creates the materials to be distributed in the conference using the creation screen. The Web application 360 receives the information of the materials created by the user using the creation screen, creates a content based on the received information, and stores the created content in the storage device of the Web application server group 150. Note that the Web application 360 provides not only the document creation service but also a mail service and a scheduling service.

To print the content created using the document creation service, the user presses a print button displayed in the creation screen. The Web application 360 receives information representing that the print button has been pressed, and transmits an access instruction, that is, a redirect instruction to the print server group 130 to the Web browser 350. Note that the redirect instruction includes a request to acquire a list corresponding to the user who is using the above-described Web browser 350, content identification information used to identify the content the user has instructed to print, and the user account. Upon receiving a content acquisition request from the print server group 130, the Web application 360 transmits the target content to the print server group 130 based on the content identification information used to identify the content sent together with the acquisition request. The description of the functions of each apparatus/server will be ended.

<Service Printer Disabling Processing Procedure>

The procedure of processing of disabling the status of a printer registered in the print service 340 by the print relay service 370 of the Web browser 330 will be described next with reference to FIG. 16.

In step S1601, the menu display unit 334 of the Web browser 330 receives, from the user, an instruction to disable printing from the print service 340. FIG. 4 shows an example of the screen of the menu display unit 334 that receives the instruction to disable printing from the print service 340. The button 402 used to instruct to disable printing from the print service 340 is displayed in the setting screen displayed by selecting the setting menu 401.

In step S1602, the print job receiving unit 332 of the print relay service 370 of the Web browser 330 stops acquiring a print job to the print job transmitting unit 345 of the print service 340. More specifically, the print job receiving unit 332 transmits a request to acquire a print job stored in the print job queue corresponding to the requested SPID to the print job transmitting unit 345 in accordance with a print request notification received from the print job transmitting unit 345 of the print service 340. The print job receiving unit 332 stops this transmission. In addition, the print job receiving unit 332 periodically confirms, with the print job transmitting unit 345, whether a print job is stored in the print job queue corresponding to the SPID of the registered printer. If a print job is stored, the print job receiving unit 332 transmits a print job acquisition request to the print job transmitting unit 345. The print job receiving unit 332 stops this transmission as well. As a result, printing from the print service 340 to the printer registered by the print relay service 370 of the Web browser 330 is not executed anymore.

In steps S1611 and S1612, the printer processing unit 335 of the Web browser 330 acquires the printer information (printer name, proxy ID, capabilities, and print setting initial value) corresponding to the SPID of the printer which has been registered at the time of printer registration in the print service 340 from the printer control unit 320. When a plurality of printers are registered in the print service 340, a plurality of SPIDs and corresponding printer information are acquired.

In steps S1621 to S1623, the print service printer management unit 331 of the print relay service 370 of the Web browser 330 logs in to the print service 340. The login is done by displaying a login screen acquired from the print service 340 on the screen display unit 333 and using a user account and password the user has input there. Alternatively, if the user has already logged in before, the login is done using information stored by the Web browser 330.

When the login has succeeded, in step S1624, the print service printer management unit 331 requests the print service 340 to disable the status of each printer using the printer information acquired in steps S1611 and S1612.

The printer disabling request is done by sending the disabled status in addition to the SPID recorded at the time of printer registration in the print service 340 and printer information (printer name, proxy ID, capabilities, and print setting initial value) corresponding to each SPID acquired in steps S1611 and S1612. FIG. 15C shows an example of the printer disabling request transmitted from the print service printer management unit 331 to the print service 340. The information described by XML includes the SPID, printer name, proxy ID, and disabled status of each printer to be disabled. Although the SPID, printer name, proxy ID, and disabled status are described here, the SPID and the disabled status suffice. When a plurality of printers are registered in the print service 340, disabling requests for the plurality of printers are sent. The requests for the plurality of printers may be transmitted at once by one-time transmission.

In step S1625, the print service 340 receives the printer disabling request from the print relay service 370, and changes the status in the printer information linked with the designated SPID to the disabled status in the printer information stored in the printer information storage unit 341. FIG. 14B is a view showing an example of information stored in the printer information storage unit 341 after the status of the service printer having the SPID="5842" registered from the print relay service having the proxy ID="Proxy-A" has been changed to the disabled status. The status 1408 of the service printer having the SPID="5842" has the value "offline" indicating the disabled status. When requests to disable a plurality of printers are received from the print relay service 370, the above-described processing is repeated as many times as the number of the plurality of printers. FIG. 14C is a view showing an example of information stored in the printer information storage unit 341 after the statuses of four service printers (SPID="5842", "1506", "5126", "1912") linked with the print relay service having the proxy ID="Proxy-A" have been changed to the disabled status. The status 1408 of the service printers having the SPID="5842", "1506", "5126", "1912" has the value "offline" indicating the disabled status.

When the status disabling has ended, the result is returned to the print relay service 370 in step S1626.

In step S1631, the Web browser 330 updates the menu display of the menu display unit 334. FIG. 13 shows an example of the updated screen of the menu display unit 334. Since printing from the print service 340 is disabled, the button 1302 used to instruct to enable printing from the print service 340 is displayed in a setting screen displayed by selecting the setting menu 1301.

The description of the procedure of processing of disabling the status of the printer registered in the print service 340 by the print relay service 370 of the Web browser 330 will be ended.

As for the procedure of enabling the disabled service printer via the proxy service incorporated in the Web browser 330, "disable" is replaced with "enable", and "stop" is replaced with "start" in the procedure shown in FIG. 16.

When, for example, the Web browser of the client has issued a printer management screen acquisition request to the print service 340, a management screen including the status of a service printer is returned in response to the request. The status is displayed on the management screen of the client, thereby notifying the client used by the share user of the service printer of the disabled status of the service printer. The Web browser of the client can prevent any attempt to use the disabled service printer by displaying the disabled service printer in a form identifiable from effective printers or refraining from displaying it.

[Second Embodiment]

In the first embodiment, a form has been described in which the statuses of all printers registered in the print service 340 by the print relay service 370 of the Web browser 330 are disabled based on printer information acquired from the printer control unit 320. In the second embodiment, a form in which a printer to be disabled is individually designated based on printer information acquired from a print service 340 will be explained with reference to FIG. 17. Note that the system arrangement is the same as in the first embodiment.

In step S1701, a menu display unit 334 of a Web browser 330 receives, from the user, an instruction to disable printing from the print service 340. In steps S1711 to S1713, login to the print service 340 is performed. The login processing is the same as in steps S1621 to S1623.

In step S1714, a screen display unit 333 of the Web browser 330 requests the print service 340 to acquire a list of printers linked with a print relay service 370 and registered. The printer list acquisition request is done using the proxy ID of the print relay service 370 as an argument. FIG. 15E shows an example of a request transmitted to the print service 340 to acquire a list of printers linked with the print relay service 370 and registered.

Information described by XML includes the proxy ID of the print relay service 370. In step S1715, the print service 340 thus acquires a list of printers linked with the proxy ID from a printer information storage unit 341. In the example shown in FIG. 14A, when a list of printers linked with the print relay service having the proxy ID="Proxy-A" is requested, a list of printers having the SPIDs="5842", "1506", "5126", "1912" is acquired. In step S1716, the acquired printer list is returned to the Web browser 330. FIG. 15F shows an example of the printer list returned from the print service 340 to the Web browser 330. Information described by XML includes the SPID of each printer between <id> tags, the printer name between <name> tags, the proxy ID between <proxy> tags, and capabilities between <capabilities> tags. Although the SPID, printer name, proxy ID, and capabilities are described here, the SPID suffices. In addition, pieces of information of a plurality of printers may be transmitted at once by one-time transmission. In this case, the <Printers> tags are described as many as the number of printers.

Figure 18:
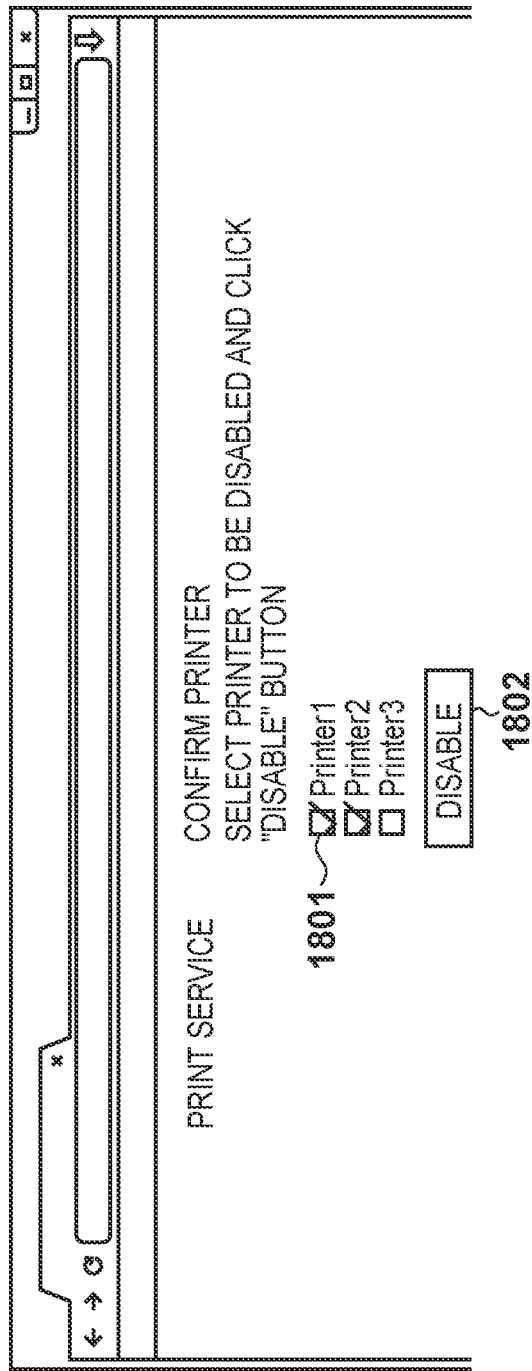
FIG. 18 is a view showing a screen UI used to select a printer to be disabled.

In step S1721, the screen display unit 333 of the Web browser 330 displays a screen to select a printer whose status is to be disabled based on the acquired printer list. FIG. 18 shows an example of the screen displayed by the screen display unit 333 and used to select a printer to be disabled. A list 1801 displays a list of printers linked with the print relay service 370 and registered together with checkboxes used to select a printer to be disabled. When the user marks the checkbox of a printer to be disabled and presses a button 1802 to instruct to disable, an instruction to disable the status of the printer of the marked checkbox is input. In step S1722, the printer to be disabled is selected, and disabling is instructed. In step S1723, a print job receiving unit 332 stops requesting reception of a print job for the print job queue corresponding to the SPID of the selected printer in the print service 340. More specifically, the print job receiving unit 332 transmits a request to acquire a print job stored in the print job queue corresponding to the SPID to a print job transmitting unit 345 in accordance with a print request notification received from the print job transmitting unit 345 of the print service 340. The print job receiving unit 332 stops this transmission. In addition, the print job receiving unit 332 periodically confirms, with the print job transmitting unit 345, whether a print job is stored in the print job queue corresponding to the SPID of the registered printer. If a print job is stored, the print job receiving unit 332 transmits a print job acquisition request to the print job transmitting unit 345. The print job receiving unit 332 stops this transmission as well. As a result, printing from the print service 340 to the printer selected in step S1722 is not executed anymore.

Figure 19:
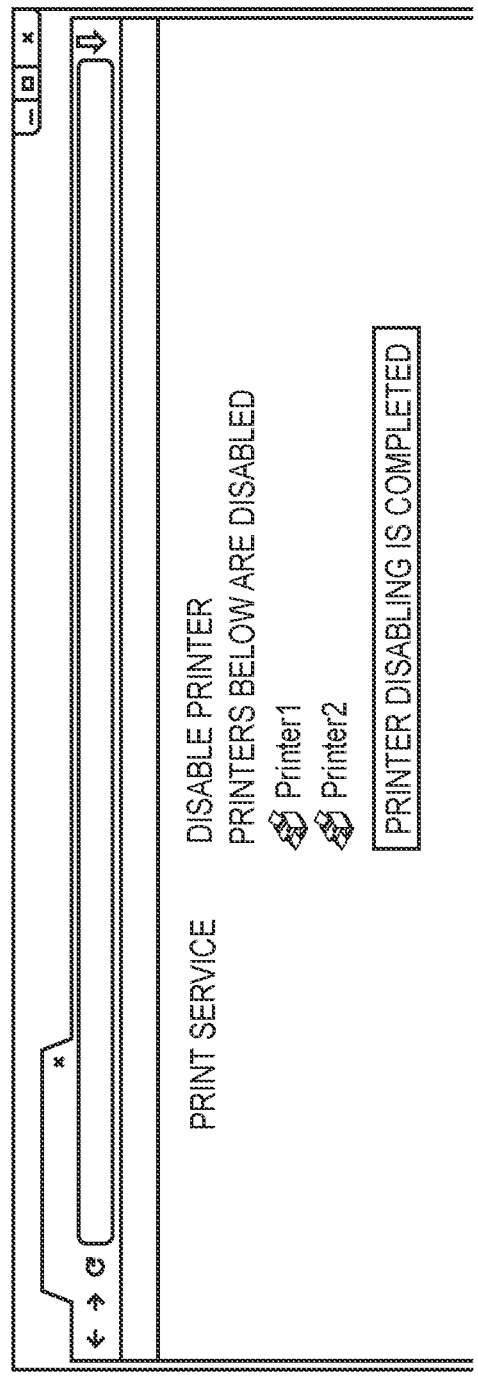
FIG. 19 is a view showing a screen UI of a result of printer disabling.

In step S1724, the print relay service 370 requests the print service 340 to disable the status of the printer selected in step S1722. The printer to be disabled is designated by the SPID. The disabling processing in steps S1724 to S1726 is the same as in steps S1624 to S1626. In step S1731, the screen display unit 333 of the Web browser 330 displays the screen as the result of disabling the status of the printer. FIG. 19 shows an example of the screen as the result of disabling.

The description of the form in which a printer to be disabled is individually designated and disabled in the Web browser 330 based on the information of each printer linked with the print relay service 370, which is acquired from the print service 340, will be ended.

Figure 17:
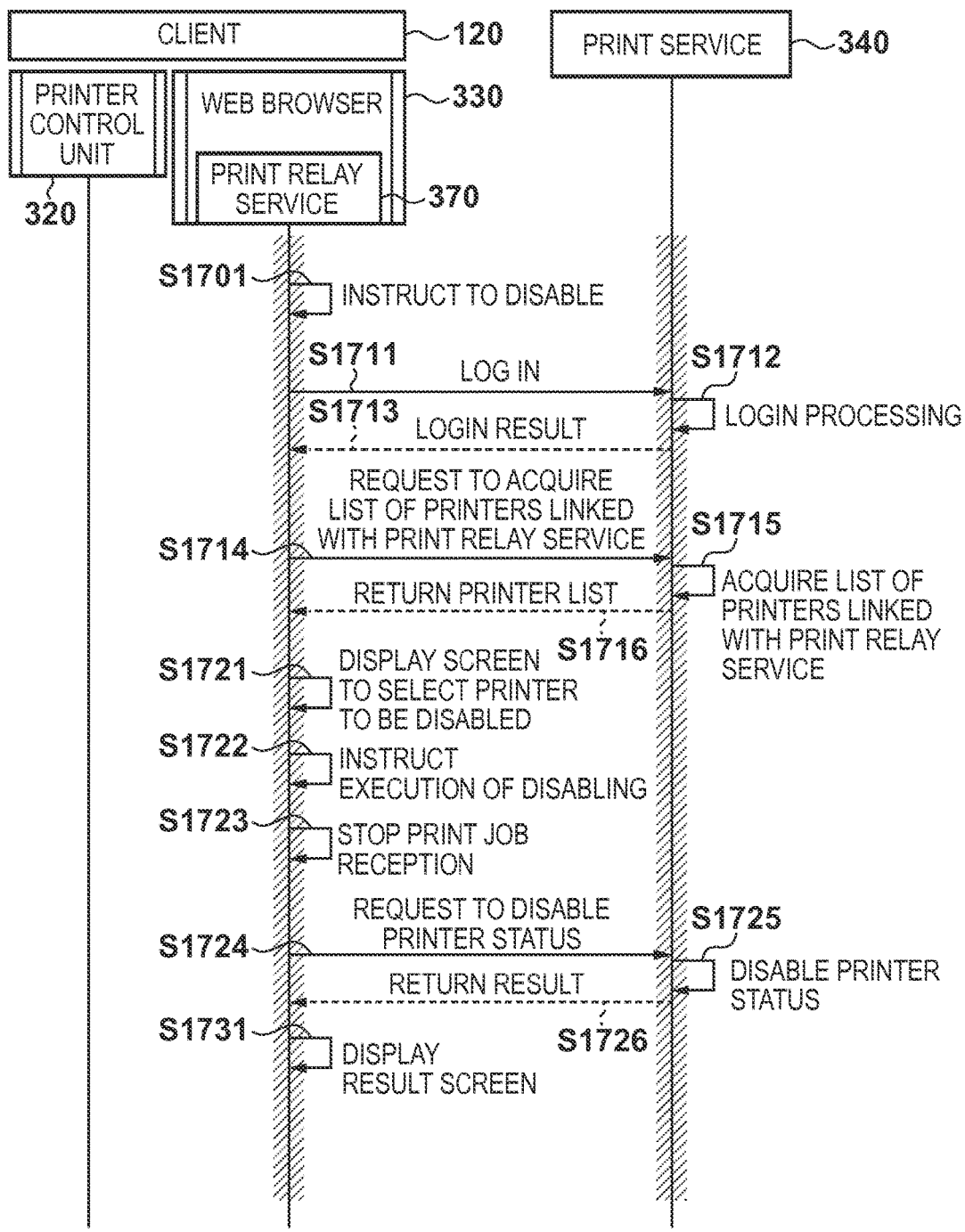
FIG. 17 is a sequence chart showing processing of individually designating printers registered in the print service 340 and associated with the print relay service 370 and disabling their statuses based on information acquired from the print service 340.

Note that as for the procedure of enabling the disabled service printer via the proxy service incorporated in the Web browser 330, "disable" is replaced with "enable", and "stop" is replaced with "start" in the procedure shown in FIG. 17. This allows to enable a printer selected from a list of disabled service printers.

A service printer can be disabled or enabled via the proxy service incorporated in the Web browser in the above-described way. As in the first embodiment, when, for example, the Web browser of the client has issued a printer management screen acquisition request to the print service 340, a management screen including the status of a service printer is returned in response to the request. The status is displayed on the management screen of the client, thereby notifying the client used by the share user of the service printer of the disabled status of the service printer. The Web browser of the client can prevent any attempt to use the disabled service printer by displaying the disabled service printer in a form identifiable from effective printers or refraining from displaying it.

[Third Embodiment]

Figure 20:
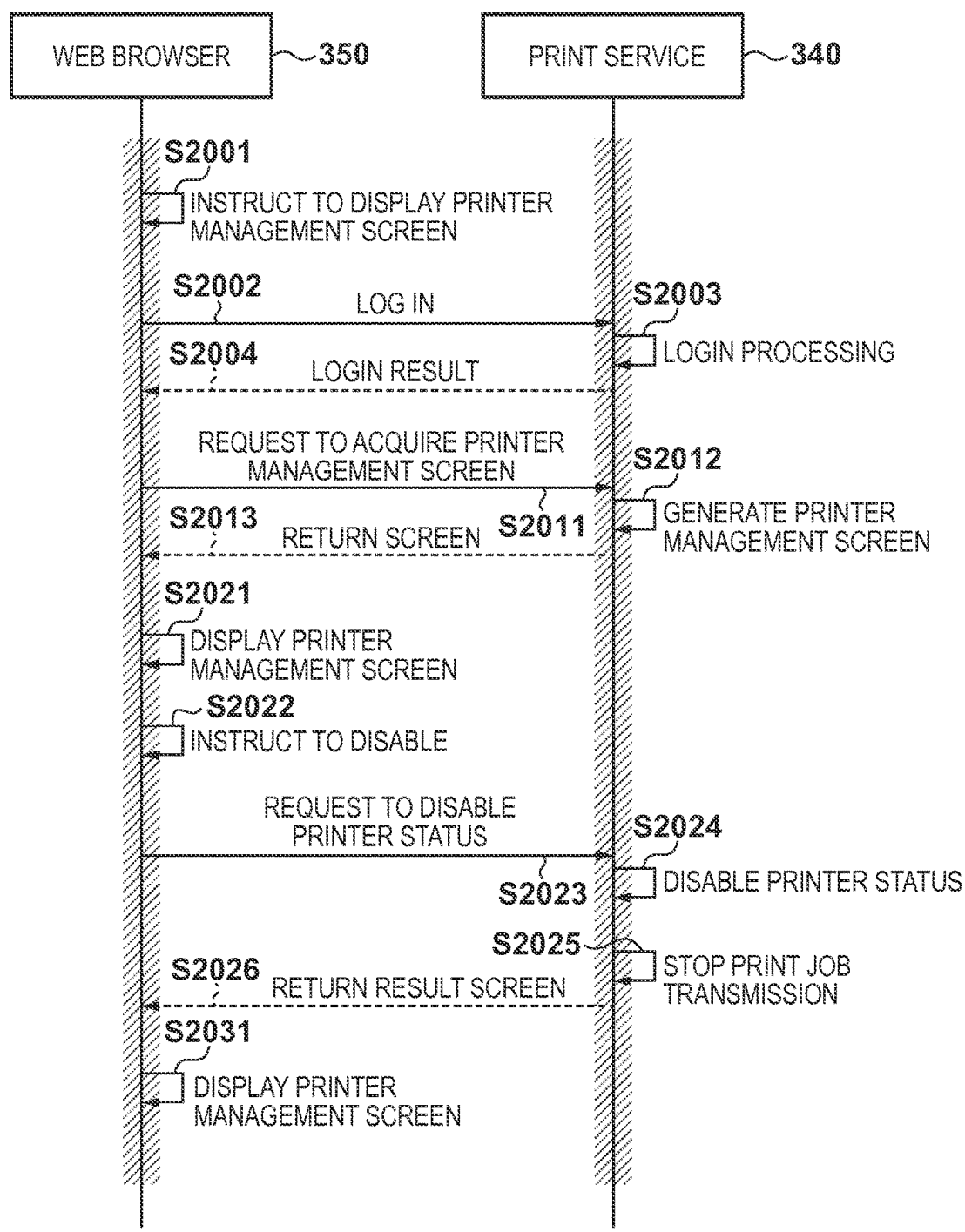
FIG. 20 is a sequence chart showing processing when an instruction is issued to disable the status of a printer in the print service 340.

In the first and second embodiments, a disabling instruction is input from the menu display unit 334 of the Web browser 330, thereby disabling a printer linked with the print relay service 370. In the third embodiment, a form in which a printer linked with a user is individually disabled from the printer management screen of a print service 340 displayed by a Web browser 350 of a client 140 will be described with reference to FIG. 20.

Figure 21:
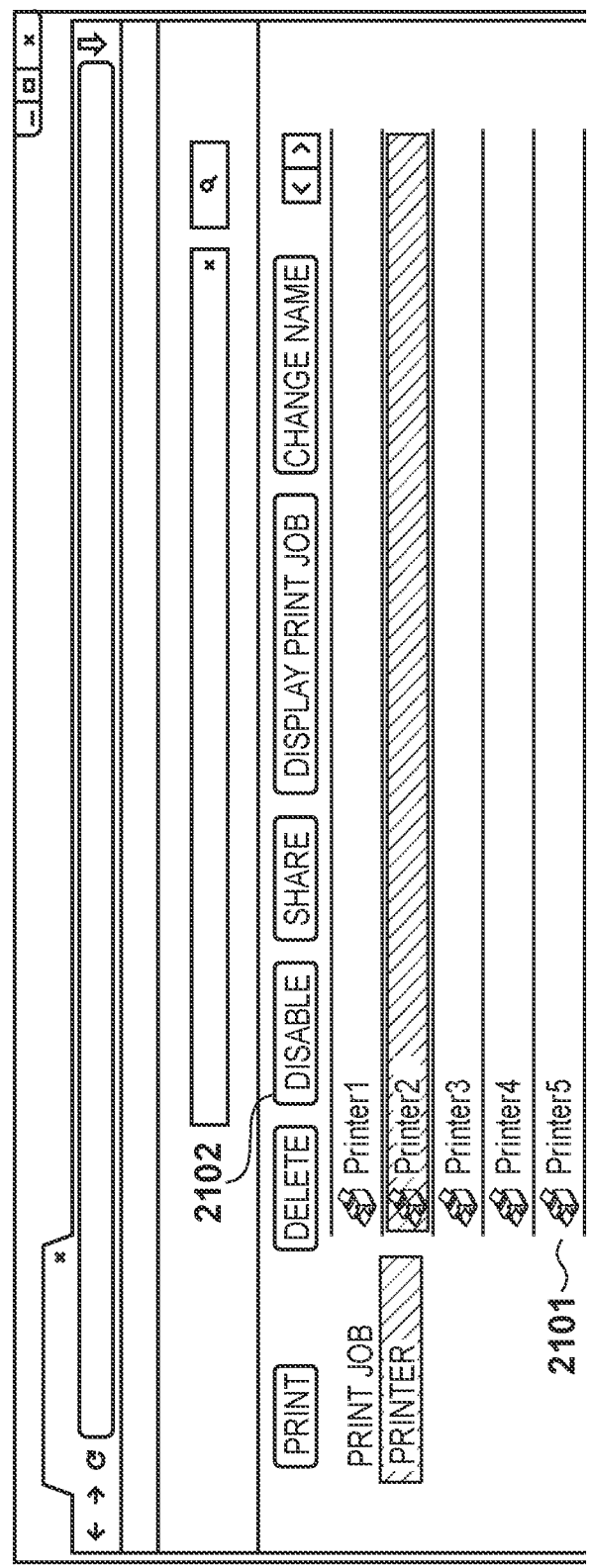
FIG. 21 is a view showing a UI used to disable a printer in the print service 340.

In step S2001, the Web browser 350 of the client 140 receives a printer management screen display instruction from the user. In steps S2002 to S2004, login to the print service 340 is performed. The login processing in steps S2002 to S2004 is the same as in steps S1621 to S1623. When the login has succeeded, the Web browser 350 requests the print service 340 to acquire a printer management screen in step S2011. The print service 340 acquires a list of printers linked with the login user account from a printer information storage unit 341 and generates a printer management screen in step S2012, and returns it to the Web browser 350 in step S2013. In step S2021, the Web browser 350 displays the acquired printer management screen. The printer management screen displays a button used to instruct disabling. FIG. 21 shows an example of the screen in which a list 2101 of printers linked with the user and a button 2102 used to instruct disabling on the printer basis are displayed. When the user selects a printer to be disabled in the printer management screen displayed on the Web browser 350 and instructs to disable the printer in step S2022, the print service 340 is requested to disable the selected service printer in step S2023. In step S2024, the print service 340 disables the status of the designated service printer. The processing of disabling the status of the service printer is the same as in step S1625. In step S2025, the print service 340 stops transmitting a print job to be stored in the print job queue of the designated service printer. The print service 340 stops transmission of a print request notification as well. For example, if the service printer has been registered from a print relay service 370, the print service 340 does not transmit the print job of the service printer to a print job receiving unit 332 of the print relay service 370, and printing is not executed anymore. In step S2026, the print service 340 returns the printer management screen on which the printer disabling result is reflected to the Web browser 350. In step S2031, the Web browser 350 displays the printer management screen on which the disabling result is reflected.

As in the first and second embodiments, when, for example, the Web browser of the client has issued a printer management screen acquisition request to the print service 340, a management screen including the status of a service printer is returned in response to the request. The status is displayed on the management screen of the client, thereby notifying the client used by the share user of the service printer of the disabled status of the service printer. The Web browser of the client can prevent any attempt to use the disabled service printer by displaying the disabled service printer in a form identifiable from effective printers or refraining from displaying it.

This ends description of the form in which a printer linked with the user is individually designated and disabled from the printer management screen of the print service 340.

[Fourth Embodiment]

Figure 22:
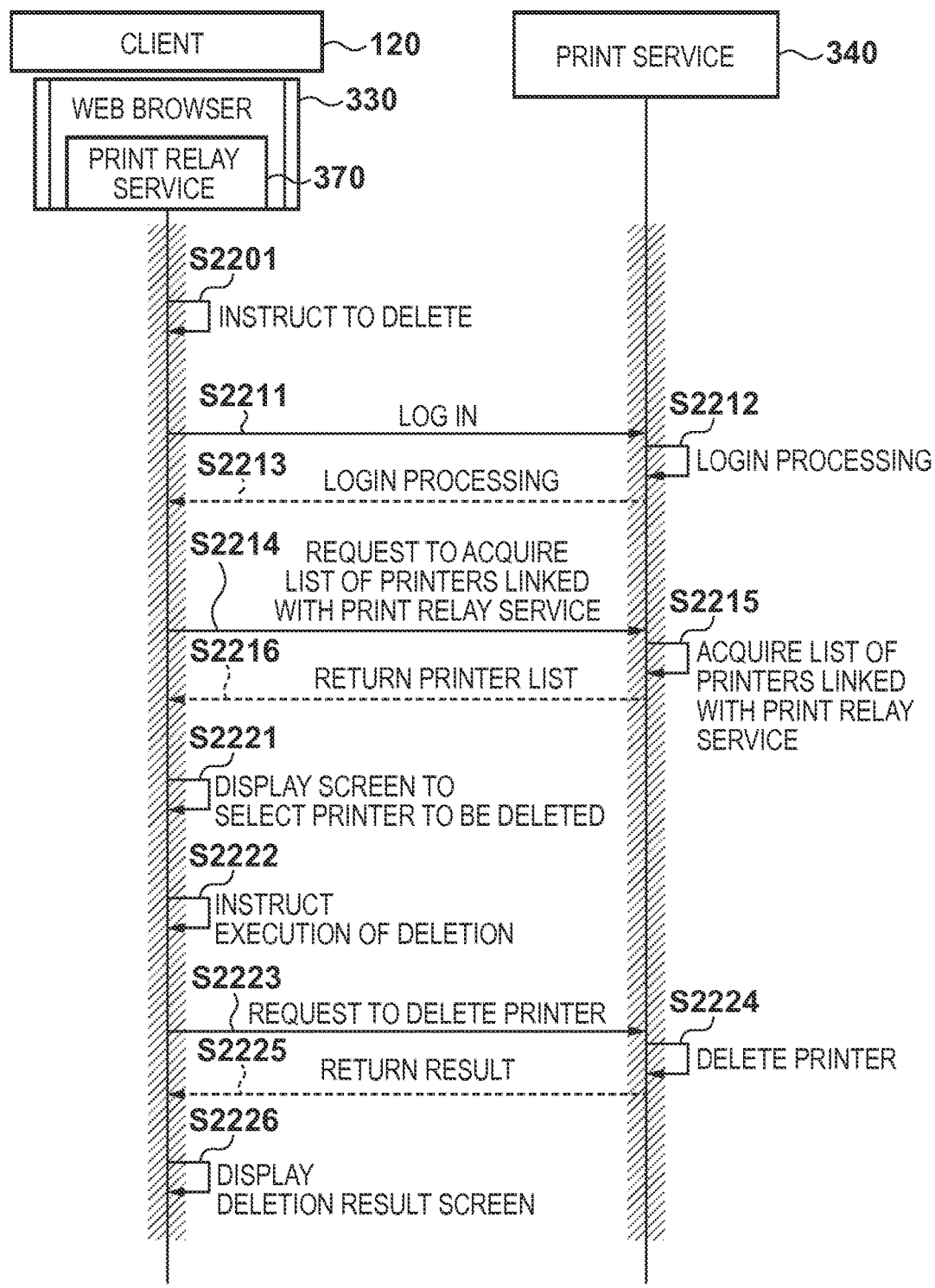
FIG. 22 is a sequence chart showing processing of deleting a printer registered in the print service 340 and associated with the print relay service 370.

In the first to third embodiments, a form in which the status of a printer is disabled has been described. In the fourth embodiment, a form in which printers linked with a print relay service 370 and registered in a print service 340 are deleted at once on a Web browser 330 will be described with reference to FIG. 22.

Figure 23:
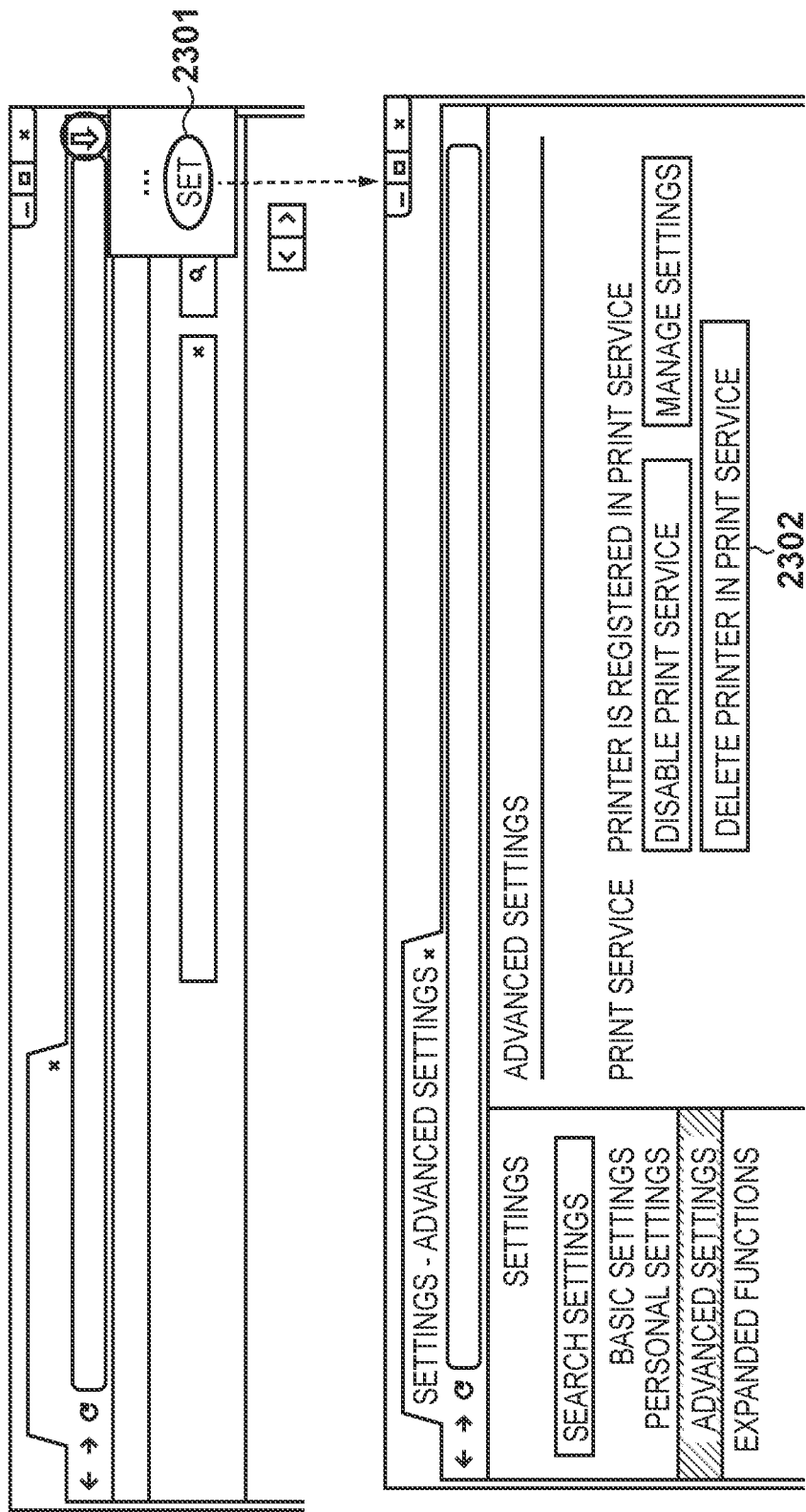
FIG. 23 is a view showing a UI used to delete a printer registered in the print service 340 on the Web browser 330.
Figure 24:
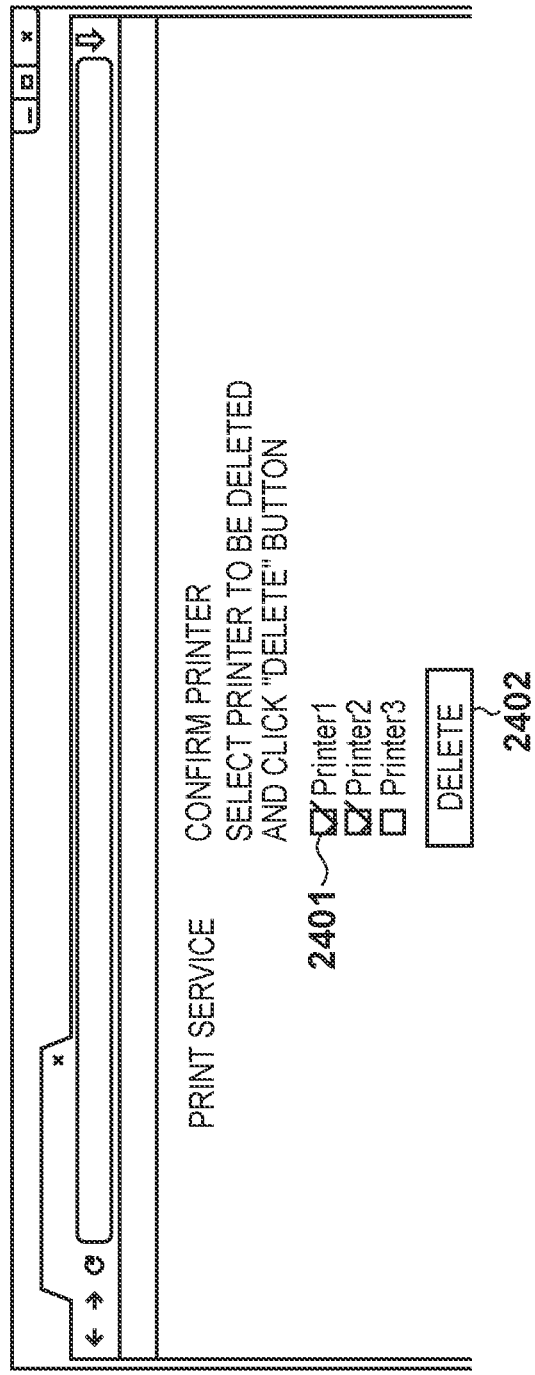
FIG. 24 is a view showing a screen UI used to select a printer to be deleted.

In step S2201, a menu display unit 334 of the Web browser 330 receives an instruction to delete printers registered in the print service 340 from the user. FIG. 23 shows an example of a screen of the menu display unit 334 used to receive the deletion instruction from the user. When the user presses a button 2302 to input an instruction to delete the printers registered in the print service 340 in a setting screen displayed by selecting a setting menu 2301, the menu display unit 334 receives the deletion instruction. Upon receiving the deletion instruction, the Web browser 330 logs in to the print service 340 in step S2211. The login processing in steps S2211 to S2213 is the same as in steps S1621 to S1623. When the login has succeeded, a screen display unit 333 of the Web browser 330 requests the print service 340 to acquire a list of printers to delete the printers linked with the print relay service 370 in step S2214. The printer list acquisition request and acquisition processing in steps S2214 to S2216 are the same as in steps S1714 to S1716. Upon acquiring the list of printers linked with the print relay service 370, the screen display unit 333 of the Web browser 330 displays a screen to instruct execution of deletion based on the acquired printer list in step S2221. FIG. 24 shows an example of the screen used to instruct execution of deletion displayed by the screen display unit 333. A list of printers linked with the print relay service 370 is displayed in 2401 together with checkboxes used to select a printer to be deleted. When the user marks the checkbox of a printer to be deleted and presses a button 2402 to instruct to delete, an instruction to delete the service printer of the marked checkbox is input. In step S2222, the service printer to be deleted is selected, and deletion is instructed. In step S2223, the print relay service 370 requests the print service 340 to delete the service printer selected in step S2222. The printer deletion request is done by sending the SPID of the printer. The printer name, proxy ID, and the like may also be included. FIG. 15G shows an example of the printer deletion request transmitted by the print relay service 370. Information expressed by XML includes the SPID and printer name of the printer to be deleted and the proxy ID. When a plurality of printers are selected in step S2222, deletion requests for the plurality of printers are sent. The requests for the plurality of printers may be transmitted at once by one-time transmission.

Upon receiving the printer deletion request from the print relay service 370, the print service 340 deletes the information of a service printer corresponding to the designated SPID from the information stored in a printer information storage unit 341 in step S2224. In the example of FIG. 14A, when a request to delete the service printer having the SPID="5842" is received, all pieces of information of the row are deleted. The deleted service printer is invisible in the print service. That is, the service printer disappears from the printer management screen of the printer manager or share user, and print job transmission to the deleted printer becomes impossible. In step S2225, the deletion result is returned to the Web browser 330. In step S2226, the screen display unit 333 of the Web browser 330 displays a screen representing the deletion result.

The description of the form in which a printer linked with the print relay service 370 and registered in the print service 340 is deleted on the Web browser 330 will be ended.

In the above-described way, the service printer associated with the proxy service can be deleted by the Web browser incorporating the proxy service.

[Fifth Embodiment]

Figure 25:
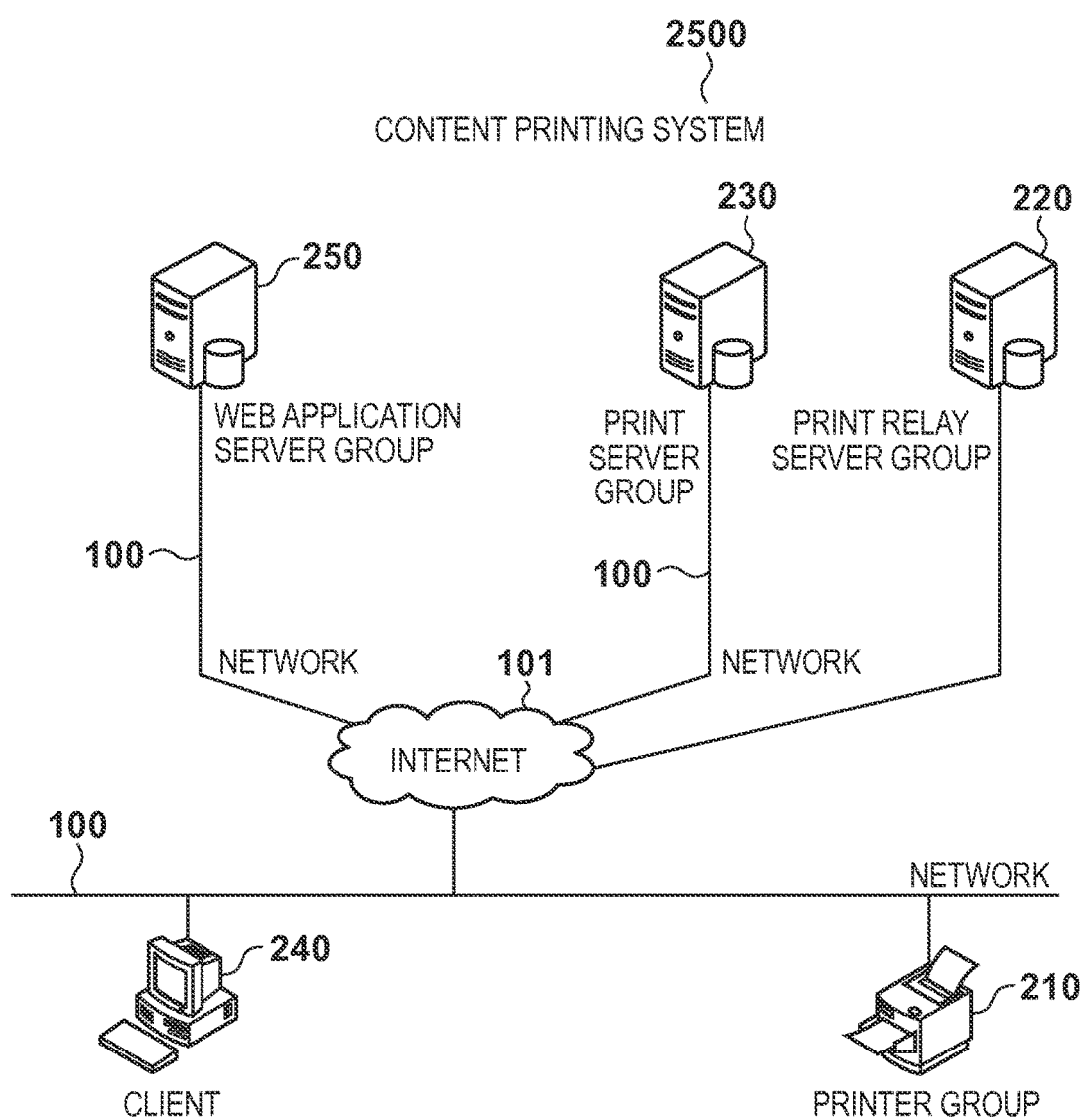
FIG. 25 is a view showing the arrangement of a content printing system 2500.

In the first to fourth embodiments, the print relay service 370 is incorporated in the Web browser 330 at the client 120 arranged in the user environment. However, the arrangement is not limited to this. For example, as shown in FIG. 25, a print relay server group 220 including a print relay service 420 may be connected to the Internet, like a print server group 230. In this embodiment, this form will be described.

FIG. 25 is a view showing the arrangement of a content printing system 2500. The content printing system 2500 includes a client 240 and a printer group 210. The client 240 and the printer group 210 are arranged in a user environment and connected to each other via a network 100. The network 100 is connected to the Internet 101. The content printing system 2500 also includes the print relay server group 220, a Web application server group 250, and the print server group 230. The three server groups may be provided by a single vendor. In this case, the three server groups may be connected via the network 100. The apparatuses and servers included in the content printing system 2500 can be connected and communicate data to each other via the Internet 101. The client 240 includes a single client but may include a plurality of clients. The printer group 210 or each server group includes a plurality of apparatuses but may include one apparatus.

Figure 26:
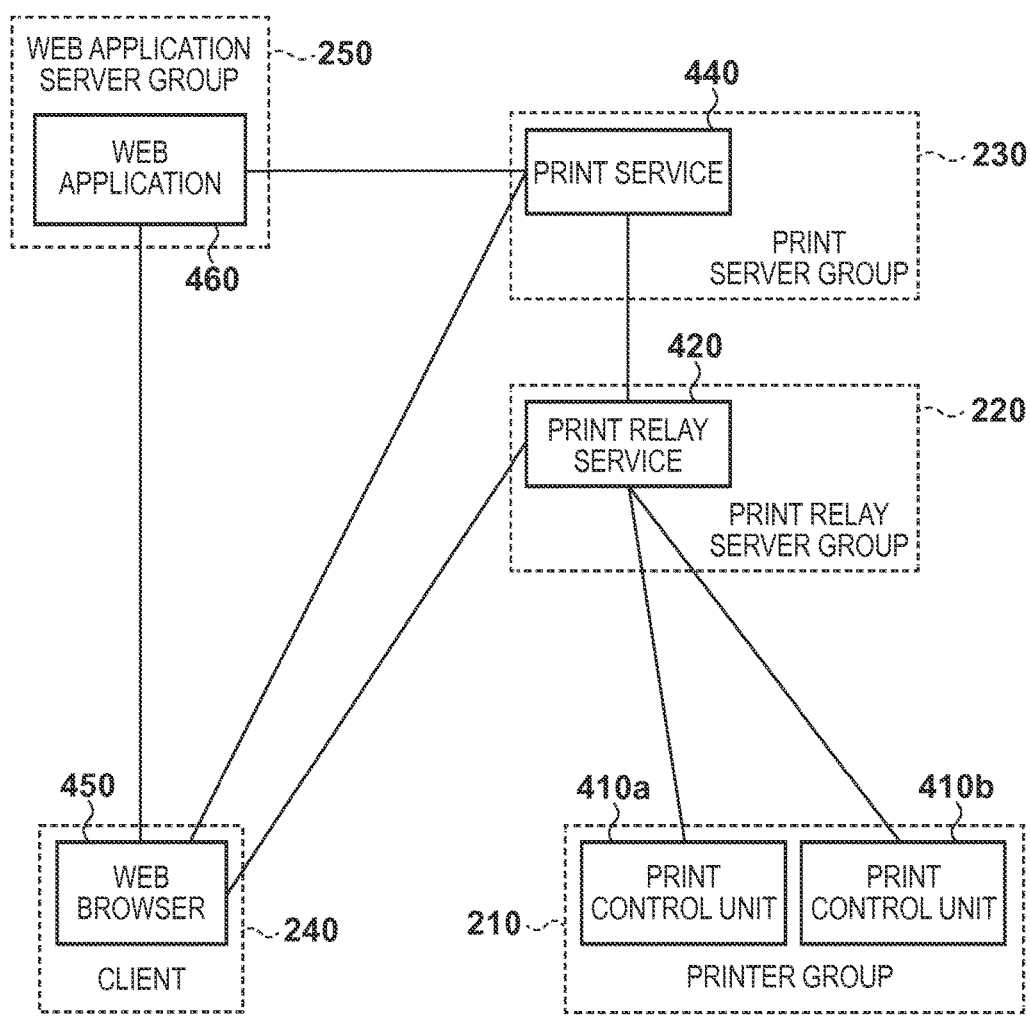
FIG. 26 is a block diagram showing the software configuration of each apparatus or server included in the content printing system 2500.

The software configuration of each apparatus or server included in the content printing system 2500 will be described next. FIG. 26 shows the software configuration of each apparatus or server included in the content printing system 2500. A program for implementing the functions of the software components shown in FIG. 26 is stored in a ROM 203 of each apparatus or server. A CPU 202 loads the program to a RAM 204 and executes it, thereby implementing the functions.

Virtual printers corresponding to print control units 410a and 410b included in the printer group 210 are registered in the print relay service 420 of the print relay server group 220. The virtual printers registered in the print relay service 420 are registered in a print service 440. The number of print control units 410a and 410b and the number of virtual printers corresponding to them can be one or two or more. One of the print control units 410a and 410b included in the printer group 210 will be referred to as a print control unit 410.

Figure 27:
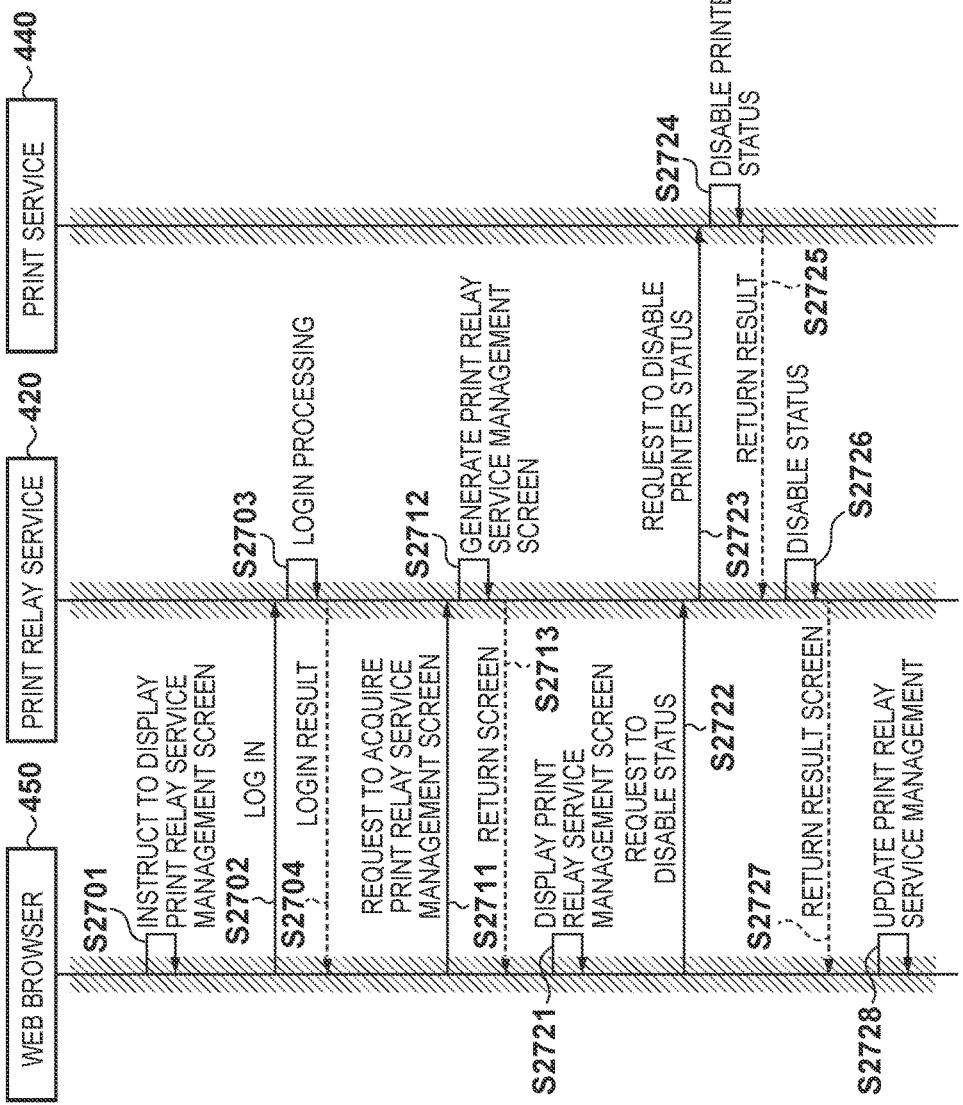
FIG. 27 is a sequence chart showing processing of disabling the status of a printer in a print relay service 420 of the content printing system 2500.

In this embodiment, the processing procedure when printing from the print service 440 is disabled in the print relay service 420 will be described with reference to FIG. 27.

Figure 28A:
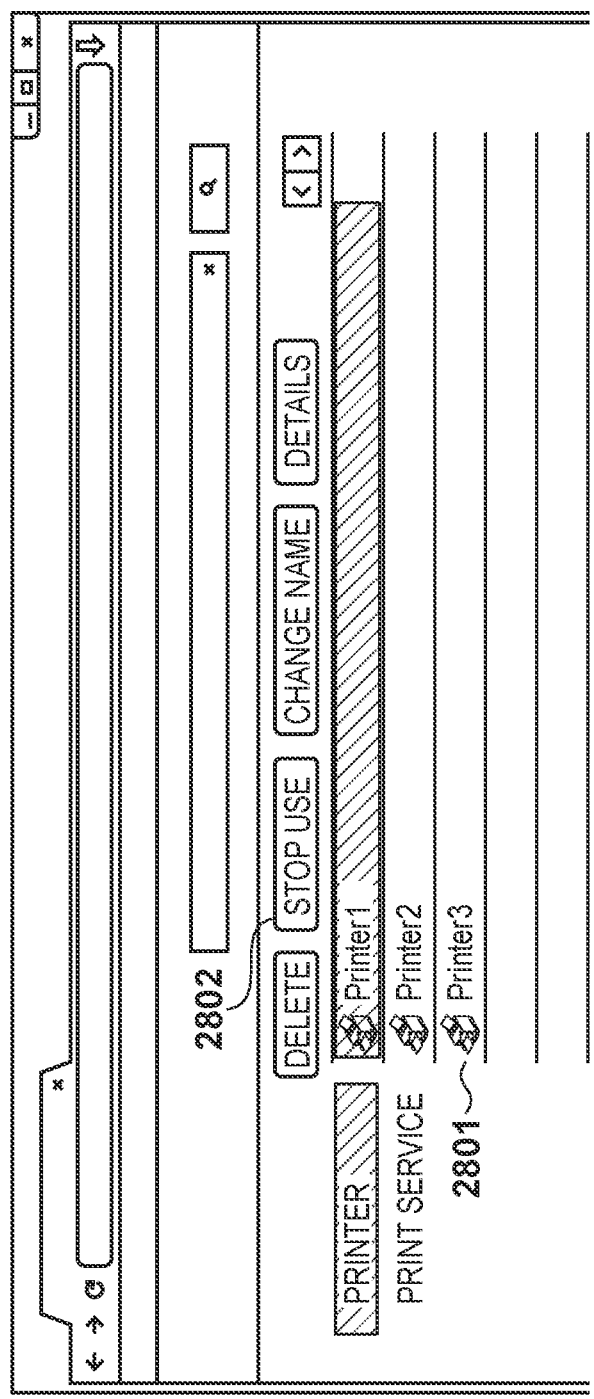
FIG. 28A is a view showing a UI used to disable a printer in the print relay service 420.
Figure 28B:
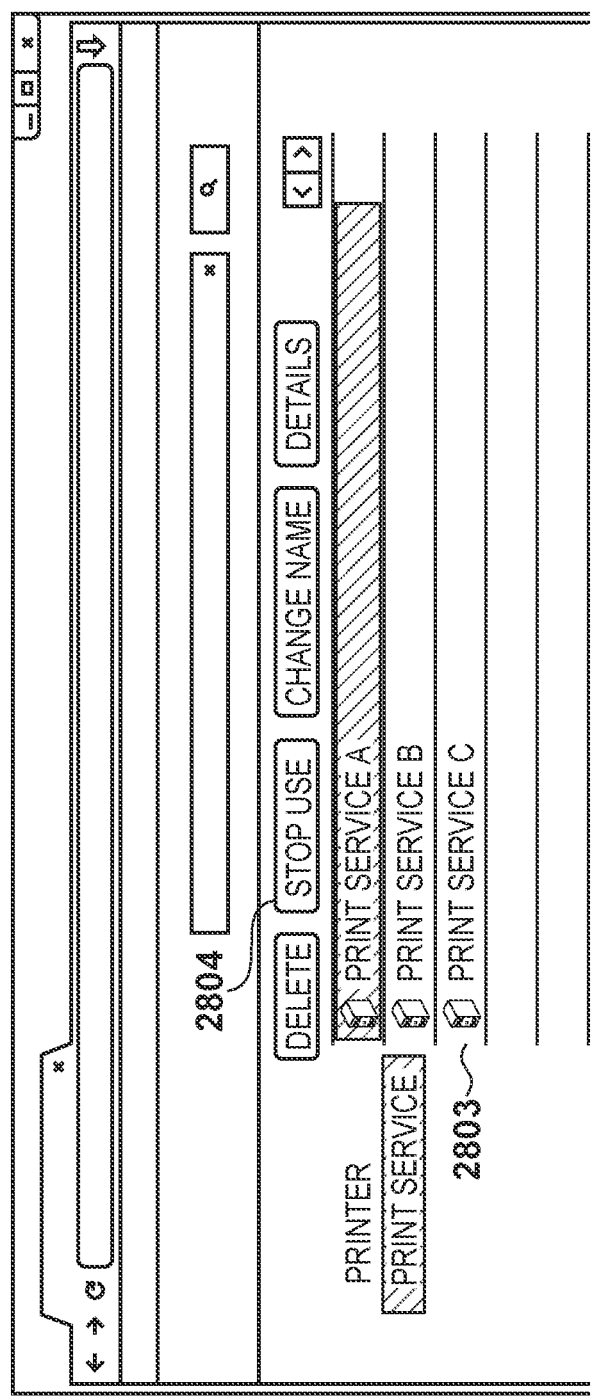
FIG. 28B is a view showing a UI used to disable a print service in the print relay service 420.

In step S2701, the user instructs to display the management screen of the print relay service 420 on a Web browser 450 of the client 240. In step S2702, the Web browser 450 requests the print relay service 420 to log in. The print relay service 420 performs login processing based on the registered user account in step S2703, and returns the login result to the Web browser 450 in step S2704. When the login has succeeded, the Web browser 450 requests the print relay service 420 to acquire a print relay service management screen in step S2711. The print relay service 420 acquires a list of virtual printers or print services linked with the login user account and generates a print relay service management screen in step S2712, and returns it to the Web browser 450 in step S2713. In step S2721, the Web browser 450 displays the acquired print relay service management screen. The print relay service management screen displays the list of virtual printers and the list of print services usable by the user who has logged in to the print relay service 420. FIGS. 28A and 28B show examples of the print relay service management screen. In FIG. 28A, a virtual printer list is displayed in 2801. In FIG. 28B, a print service list is displayed in 2803. In addition, buttons 2802 and 2804 used to instruct to stop using each of the print services and virtual printers are displayed. When an instruction to stop use of a virtual printer is input in the print relay service management screen in step S2722, the print relay service 420 requests all print services (in this case, the print service 440) in which the designated virtual printer is registered to disable the status of the designated virtual printer in step S2723. When an instruction to stop use of a print service is input in step S2722, the print relay service 420 requests the designated print service (in this case, the print service 440) to disable the statuses of all virtual printers registered in the print service in step S2723. It is necessary to log in to the print service before this request (not shown). The login to the print service is done using a user account and password recorded by the print relay service 420 or a user account and password the user has input to a login screen generated by the print service 440 and displayed by the print relay service 420. The print service 440 changes the status of the requested service printer to the disabled status in step S2724 and returns the result to the print relay service 420 in step S2725. The print relay service 420 also disables the virtual printer or print service instructed to stop use in step S2726 and transmits the print relay service management screen on which the result is reflected to the Web browser 450 in step S2727. In step S2728, the Web browser 450 displays the acquired print relay service management screen.

With the above-described processing, when the user stops use of the print service 440 or a virtual printer registered in the print service 440 and changes it to the disabled status in the print relay service 420, the state can be reflected on the print service 440.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-125152, filed May 31, 2012, which is hereby incorporated by reference herein in its entirety.

The invention claimed is:

1. A content printing system comprising a printing system and an information processing apparatus, wherein the printing system registers a service printer associated with a printer, and generates print data based on content data in accordance with a print instruction via the service printer, the print data being provided to the printer associated with the service printer, and the information processing apparatus has a second Web browser including a print relay service, the print relay service being capable of communicating with the printer, a terminal having a first Web browser that instructs the printer to print via the service printer and the printing system, wherein the second Web browser receives the print data generated by the print system and transmits the received print data to a destination printer associated with the second Web browser, and the information processing apparatus including at least one processor and at least one memory coupled to the at least one processor and having stored thereon instructions which, when executed by the at least one processor, cause the at least one processor to function as:

a display unit configured to display a setting window of the second Web browser, the setting window containing a button for inputting an instruction to delete a printer associated with the second Web browser in response to that displaying the setting window is instructed via a menu of the second Web browser;

a reception unit configured to receive the instruction to delete the service printer registered in the printing system in response to a push of the button contained in the setting window displayed by the display unit of the second Web browser; and a deletion instruction unit configured to transmit, to the printing system, the instruction to delete the service printers registered via the second Web browser in the printing system after the reception unit has received the instructions to delete the service printer, wherein the printing system comprises a deletion unit configured to delete the service printer to be deleted according to the instruction received from the deletion instruction unit.

2. The system according to claim 1, wherein said deletion instruction unit transmits the instructions to delete a designated service printer out of the service printers associated with the second Web browser.

3. The system according to claim 1, wherein the second Web browser further comprises an acquisition unit configured to acquire a list of service printers from the printing service, the display unit is configured to display the list of the service printers upon receiving the instruction to delete a printer in the instruction portion, and the deletion instruction unit is configured to transmit the instruction to delete the service printers designated in the list of the service printers to the printing system.

4. The system according to claim 1, wherein the second Web browser further comprises a login unit configured to login the printing system according to a user account before accessing the printing system.

5. A method of deleting a service printer in a content printing system which comprises a printing system and an information processing apparatus, wherein the printing system registers a service printer associated with a printer, and generates print data based on content data in accordance with a print instruction via the service printer, the print data being provided to the printer associated with the service printer, and the information processing apparatus has a second Web browser including a print relay service, the print relay service being capable of communicating with the printer, a terminal having a first Web browser that instructs the printer to print via the service printer and printing system, and wherein the second Web browser receives the print data generated by the print system and transmitting the received print data to a destination printer associated with the second Web browser, the method comprising:

displaying, by the Web browser, a setting window of the second Web browser, the setting window containing a button for inputting an instruction to delete a printer associated with the second Web browser in response to that displaying the setting window is instructed via a menu of the second Web browser;

receiving, by the Web browser, the instruction to delete the service printer registered in the printing system in response to a push of the button contained in the setting window displayed in the displaying by the second Web browser;

transmitting, by the Web browser, the instruction to delete the service printers to the printing system via the second Web browser after the instruction to delete the service printer has been received in the receiving; and deleting, by the printing system, the service printer to be deleted according to the instruction transmitted in the transmitting.

6. An information processing apparatus comprising a second Web browser including a print relay service, the print relay service being capable of communicating with a printer, a terminal having a first Web browser that instructs the printer to print via the service printer and a printing system that registers a service printer associated with a printer, and generates print data based on content data in accordance with a print instruction via the service printer, the print data being provided to the printer associated with the service printer, wherein the second Web browser receives the print data generated by the print system and transmits the received print data to a destination printer associated with the second Web browser, and the information processing apparatus including at least one processor and at least one memory coupled to the at least one processor and having stored thereon instructions which, when executed by the at least one processor, cause the at least one processor to function as:

a display unit configured to display a setting window of the second Web browser, the setting window containing a button for inputting an instruction to delete a printer associated with the second Web browser in response to that displaying the setting window is instructed via a menu of the second Web browser;

a reception unit configured to receive the instruction to delete the service printer registered in the printing system in response to a push of the button contained in the setting window displayed by the display unit of the second Web browser; and a deletion instruction unit configured to transmit, to the printing system, the instruction to delete the service printers registered via the second Web browser in the printing system after the reception unit has received the instruction to delete the service printer.

7. The apparatus according to claim 6, wherein the second Web browser further comprises an acquisition unit configured to acquire a list of service printers from the printing service, the display unit is configured to display the list of the service printers upon receiving the instruction to delete a printer in the instruction portion, and the deletion instruction unit is configured to transmit the instruction to delete the service printers designated in the list of the service printers to the printing system.

8. The apparatus according to claim 6, wherein the second Web browser further comprises a login unit configured to login the printing system according to a user account before accessing the printing system.

9. A method of deleting a service printer in an information processing apparatus comprising a second Web browser including a print relay service, the print relay service being capable of communicating with a printer, a terminal having a first Web browser that instructs the printer to print via the service printer and a printing system that registers a service printer associated with a printer, and generates print data based on content data in accordance with a print instruction via the service printer, the print data being provided to the printer associated with the service printer, wherein the second Web browser receives the print data generated by the print system and transmits the received print data to a destination printer associated with the second Web browser, the method comprising:

displaying, by the second Web browser, a setting window of the second Web browser, the setting window containing a button for inputting an instruction to delete a printer associated with the second Web browser in response to that displaying the setting window is instructed via a menu of the second Web browser;

receiving the instruction to delete the service printer registered in the printing system in response to a push of the button contained in the setting window displayed in the displaying by the second Web browser; and transmitting, to the printing system, the instruction to delete the service printers registered via the second Web browser in the printing system after the instruction to delete the service printer has been received in the receiving.

10. A non-transitory computer readable medium having stored therein a program for causing an information processing apparatus to execute a method of deleting a service printer in the information processing apparatus comprising a second Web browser including a print relay service, the print relay service being capable of communicating with a printer, a terminal having a first Web browser that instructs the printer to print via the service printer and a printing system that registers a service printer associated with a printer, and generates print data based on content data in accordance with a print instruction via the service printer, the print data being provided to the printer associated with the service printer, wherein the second Web browser receives the print data generated by the print system and transmits the received print data to a destination printer associated with the second Web browser, the method comprising:

displaying, by the second Web browser, a setting window of the second Web browser, the setting window containing a button for inputting an instruction to delete a printer associated with the second Web browser in response to that displaying the setting window is instructed via a menu of the second Web browser;

receiving the instruction to delete the service printer registered in the printing system in response to a push of the button contained in the setting window displayed in the displaying by the second Web browser; and transmitting, to the printing system, the instruction to delete the service printers registered via the second Web browser in the printing system after the instruction to delete the service printer has been received in the receiving.

\* \* \* \* \*